United States Patent
Burcham et al.

(10) Patent No.: US 6,436,288 B1
(45) Date of Patent: Aug. 20, 2002

(54) BAST MEDIUM BIOLOGICAL REACTOR TREATMENT SYSTEM FOR REMEDIATION AND ODOR SUPPRESSION OF ORGANIC WASTE STREAMS

(75) Inventors: Timothy N. Burcham; Jeffrey Jones; Eugene P. Columbus; Mark E. Zappi, all of Mississippi State, MS (US)

(73) Assignee: Mississippi State University, Mississippi State, MS (US)

( * ) Notice: Subject to any disclaimer, the term of this patent is extended or adjusted under 35 U.S.C. 154(b) by 0 days.

(21) Appl. No.: 09/500,072

(22) Filed: Feb. 8, 2000

Related U.S. Application Data

(60) Provisional application No. 60/118,999, filed on Feb. 8, 1999.

(51) Int. Cl.⁷ .................................................. C02F 3/00
(52) U.S. Cl. ....................... 210/602; 210/605; 210/615; 210/630; 210/505; 210/916
(58) Field of Search .......................... 210/602, 615–618, 210/620–623, 505, 605, 630, 916

(56) References Cited

U.S. PATENT DOCUMENTS

| | | |
|---|---|---|
| 681,884 A | 9/1901 | Monjeau |
| 3,238,124 A | 3/1966 | Burton |

(List continued on next page.)

OTHER PUBLICATIONS

Burcham, T.N. et al. "Using Dairy Effluent to Produce Kenaf for Whole–Stalk Freestall Bedding," In Proceedings of the Ninth annual International Kenaf Association Conference, La Posada Resort Hotel, Scottsdale, AZ (Mar. 27–29, 1997). p. 7.

Chol, H. et al. "Natural Sorbents in Oil Spill Cleanup," Environmental Science Technology. vol. 26, No. 4:772–776(1992).

Fox, I.A. "Human Physiology," Fourth Edition, Wm. C. Brown Publishers, 2460 Kerper Boulevard, Dubuque, IA 52001(1993). (Title Page).

Hollowell, J.E., et al. "Evaluation of Kenaf as a Potential Forage for the Southeast United States." In Proceedings of the Eigth Annual International Kenaf Association Conference, Albuquerque Convention Center, Albuquerque, NM (Mar. 21–23, 1996). pp. 36–43.

Metcalf & Eddy, Inc. "Wastewater Engineering: Treatment, Disposal, and Reuse" McGraw–Hill, Inc., New York, NY (1991). (Title Page).

Miner, J.R. "A Review of the Literature on the Nature and Control of Odors From Pork Production Facilities" The Odor Subcommittee of the Environmental Committee of the National Pork Producers Council (1995).

(List continued on next page.)

*Primary Examiner*—Chester T. Barry
(74) *Attorney, Agent, or Firm*—Piper Rudnick LLP; Steven B. Kelber

(57) ABSTRACT

The invention relates to a holistic sustainable wastewater treatment system that utilizes a bast medium as the attached growth medium. The wastewater treatment system of the present invention (Bast Medium Biological Reactor Treatment System) reduces odors and in-house ammonia levels and increases the overall water quality of organic waste streams. It uses naturally occurring microorganisms to process wastewater and remove odor without chemical augmentation. The Bast Medium Biological Reactor Treatment System is simple, with few moving parts and low maintenance requirements. The invention also relates to a method for treating wastewater using the wastewater treatment system according to the present invention.

13 Claims, 28 Drawing Sheets

U.S. PATENT DOCUMENTS

| | | | |
|---|---|---|---|
| 3,728,254 | A | 4/1973 | Carothers |
| 3,855,120 | A * | 12/1974 | Garbo |
| 3,966,599 | A | 6/1976 | Burkhead |
| 3,966,608 | A | 6/1976 | Mason et al. |
| 4,034,078 | A | 7/1977 | Van Horn |
| 4,122,011 | A | 10/1978 | Strigle, Jr. |
| 4,182,675 | A | 1/1980 | Jeris |
| 4,263,142 | A | 4/1981 | Burton |
| 4,279,753 | A | 7/1981 | Neilson et al. |
| 4,322,296 | A | 3/1982 | Fan et al. |
| 4,336,135 | A | 6/1982 | Price |
| 4,351,729 | A | 9/1982 | Witt |
| 4,482,458 | A | 11/1984 | Rovel et al. |
| 4,487,697 | A | 12/1984 | Bohnke et al. |
| 4,530,762 | A | 7/1985 | Love |
| 4,532,042 | A | 7/1985 | Aivasidis et al. |
| 4,560,479 | A | 12/1985 | Heijnen |
| 4,561,974 | A | 12/1985 | Bernhard et al. |
| 4,618,418 | A | 10/1986 | Heijnen et al. |
| 4,627,917 | A | 12/1986 | Morper |
| 4,676,907 | A | 6/1987 | Harrison |
| 4,707,252 | A | 11/1987 | Durot et al. |
| 4,818,404 | A | 4/1989 | McDowell |
| 4,882,058 | A | 11/1989 | Burton |
| 4,895,645 | A | 1/1990 | Zorich et al. |
| 4,990,449 | A | 2/1991 | Caissel |
| 5,049,265 | A | 9/1991 | Boyd et al. |
| 5,049,266 | A | 9/1991 | Gotz et al. |
| 5,116,505 | A | 5/1992 | Lourens et al. |
| 5,174,900 | A | 12/1992 | Nichols et al. |
| 5,176,100 | A | 1/1993 | Fujino |
| 5,192,442 | A | 3/1993 | Piccirillo et al. |
| 5,238,583 | A | 8/1993 | Fortson |
| 5,271,691 | A | 12/1993 | Willett et al. |
| 5,330,652 | A | 7/1994 | Goldman et al. |
| 5,338,447 | A | 8/1994 | Vellinga |
| 5,338,452 | A | 8/1994 | Pidaparti |
| 5,348,654 | A | 9/1994 | Fischer |
| 5,366,520 | A | 11/1994 | Tiemeyer |
| 5,482,630 | A | 1/1996 | Lee et al. |
| 5,545,327 | A | 8/1996 | Volland |
| 5,595,893 | A | 1/1997 | Pometto, III et al. |
| 5,651,891 | A | 7/1997 | Molof et al. |
| 5,656,421 | A | 8/1997 | Gebhard et al. |
| 5,660,142 | A | 8/1997 | Van Rijn |
| 5,679,252 | A | 10/1997 | Gotou et al. |
| 5,733,454 | A | 3/1998 | Cummings |
| 5,733,455 | A | 3/1998 | Molof et al. |
| 5,736,049 | A | 4/1998 | Bundy et al. |
| 5,738,713 | A | 4/1998 | Firth |
| 5,817,240 | A * | 10/1998 | Miller |
| 5,834,385 | A | 11/1998 | Blaney et al. |
| 6,123,840 | A * | 9/2000 | Suzuki |

OTHER PUBLICATIONS

Meilgaard, M. et al. "Sensory Evaluation Techniques," $2^{nd}$ ed. CRC Press, Inc., Boston (1991). (Title Page).

Nagle, H.T. et al. "Development of the Electronic Nose For Monitoring" In Proceedings of the 1999 Animal Waste Management Symposium, Embassy Suite Hotel and Conference Center, Raleigh, NC (Jan. 27–28, 1999). pp. 119–127.

NCARS/NCSU "Control of Odor Emissions From Animal Operations" A report from the Board of Governors of the University of North Carolina (Sep., 1998).

Nicolai, R.E. "Managing Odors From Swine Waste," Department of Biosystems and Agricultural Engineering, Minnesota Extension Service, University of Minnesota, Publication: AEU–8 (1998).

Reichert, N.A. et al. "Mississippi State University Kenaf-–Based Potting Media: From Refinement to Commercialization," In Proceedings of the Eigth Annual International Kenaf Association Conference, Albuquerque Convention Center, Albuquerque, NM (Mar. 21–23, 1996). pp. 50–55.

Sellers Jr., T. et al. "Kenaf Core as a Board Raw Material," Forest Products Journal, vol. 43, No. 7/8 (Jul./Aug., 1993).

Ramaswamy, G.N. et al. "Durability and Aesthetic Properties of Kenaf/Cotton Blend Fabrics," Textile Research Journal, vol. 67, No. 11:803–808 (Nov., 1997).

* cited by examiner

US 6,436,288 B1

BAST MEDIUM BIOLOGICAL REACTOR TREATMENT SYSTEM FOR REMEDIATION AND ODOR SUPPRESSION OF ORGANIC WASTE STREAMS

CROSS-REFERENCE TO RELATED APPLICATIONS

This application is a regular National application claiming priority from Provisional Application, U.S. Application Serial No. 60/118,999 filed Feb. 8, 1999. The entirety of that provisional application is incorporated herein by reference.

BACKGROUND OF THE INVENTION

FIELD OF THE INVENTION

The present invention relates to a sustainable wastewater treatment system that utilizes a bast medium as the attached growth medium. The wastewater treatment system of the present invention reduces odors and in-house ammonia levels and increases the overall water quality of organic waste streams. The invention also relates to a method for treating wastewater using the wastewater treatment system according to the present invention.

DISCUSSION OF THE BACKGROUND

Odor is an increasing concern in many agricultural locations across the United States. In particular, odor generated by waste and wastewater from confined animal housing operations has received national media attention. There is increasing public concern associated with nuisance odor and potential environmental problems associated with untreated or partially treated wastewater from confined animal feeding operations.

For example, odor associated with swine production facilities has been a limiting factor with regard to the expansion of the swine industry. These odors have been identified from three major sources: (1) building and facilities, (2) outside storage systems, and (3) land application of manure and wastewater. (Nicolai. R. E., Managing Odors from Swine Waste, Department of Biosystems and Agricultural Engineering, Minnesota Extension Service, University of Minnesota, Publication AEU-8, 1998). In response to the public concern associated with nuisance odor and potential environmental problems, the legislatures of both North Carolina and Mississippi have placed moratoriums on the expansion of the swine industry in their respective states.

Perception of an odor is a psychological response to an odorant, the actual molecule or molecules that cause the neurological response. The olfactory receptors transmit sensations directly to the olfactory bulb of the cerebral cortex. This portion of the brain, formerly called the "smell brain", is part of the limbic system which is now known to be the center for basic emotional drives and motivation. (Fox I. A., Human Physiology, Fourth Edition, Wm. C. Brown Publishers, 1993).

Anaerobic processes, common to virtually all swine production facilities, release ammonia, hydrogen sulfide, and volatile fatty acids such as organic acids, alcohols, aldehydes, fixed gases, carbonyls, esters, amines, sulfides, mercaptans, and nitrogen heterocycles. With such a wide array of odorants being released into the air, it is likely that one of these compounds will trigger an unfavorable emotional response in the limbic systems of humans and create a nuisance odor.

Today, modern swine production facilities use large quantities of flush-water to remove feces and urine from swine production buildings. This dominant practice has predicated the use of anaerobic lagoons for wastewater treatment. Unfortunately, anaerobic lagoons designated for these facilities cannot treat the waste stream to a level that can be legally discharged under DEQ/EPA requirements. Further, these anaerobic lagoons do not remove all of the odorants from the wastewater. Subsequent land application may release these odorants into the air, thereby exacerbating odor complaints.

Although there are known methods for odor reduction, no current technology has proven to be cost-effective on a commercial production scale. Accordingly, it remains a goal of those of skill in the art to obtain a wastewater treatment system that both reduces odor and biologically treats water from organic waste streams in a cost-effective manner.

In order to address these problems in the art, the present inventors have designed the Bast Medium Biological Reactor Treatment System (BMBRTS) which uses a natural bast medium in an attached-growth reactor.

SUMMARY OF THE INVENTION

It is an object of the present invention to provide a holistic wastewater treatment system that can be implemented for the treatment of organic waste streams.

It is a further object of the present invention to provide a wastewater treatment system that reduces or eliminates odor.

It is another object of the present invention to provide a wastewater treatment system that utilizes a bast medium and naturally occurring microorganisms to biologically treat wastewater and reduce odor.

It is yet another object of the present invention to provide a wastewater treatment system that produces a stabilized end product suitable for cost-effective export.

It is a further object of the present invention to provide a wastewater treatment system that can be implemented in a cost effective manner.

It is another object of the present invention to provide a wastewater treatment system that can be implemented as part of a sustainable waste management system.

With the foregoing and other objects, advantages and features of the invention that will become hereinafter apparent, the nature of the invention may be more clearly understood by reference to the following detailed description of the preferred embodiments of the invention and to the appended claims.

DESCRIPTION OF THE PREFERRED EMBODIMENTS

The Bast Medium Biological Reactor Treatment System (BMBRTS) is a holistic sustainable wastewater treatment system that can be implemented for treatment of most organic waste streams, particularly waste streams from confined animal feeding operations.

Figure 3:
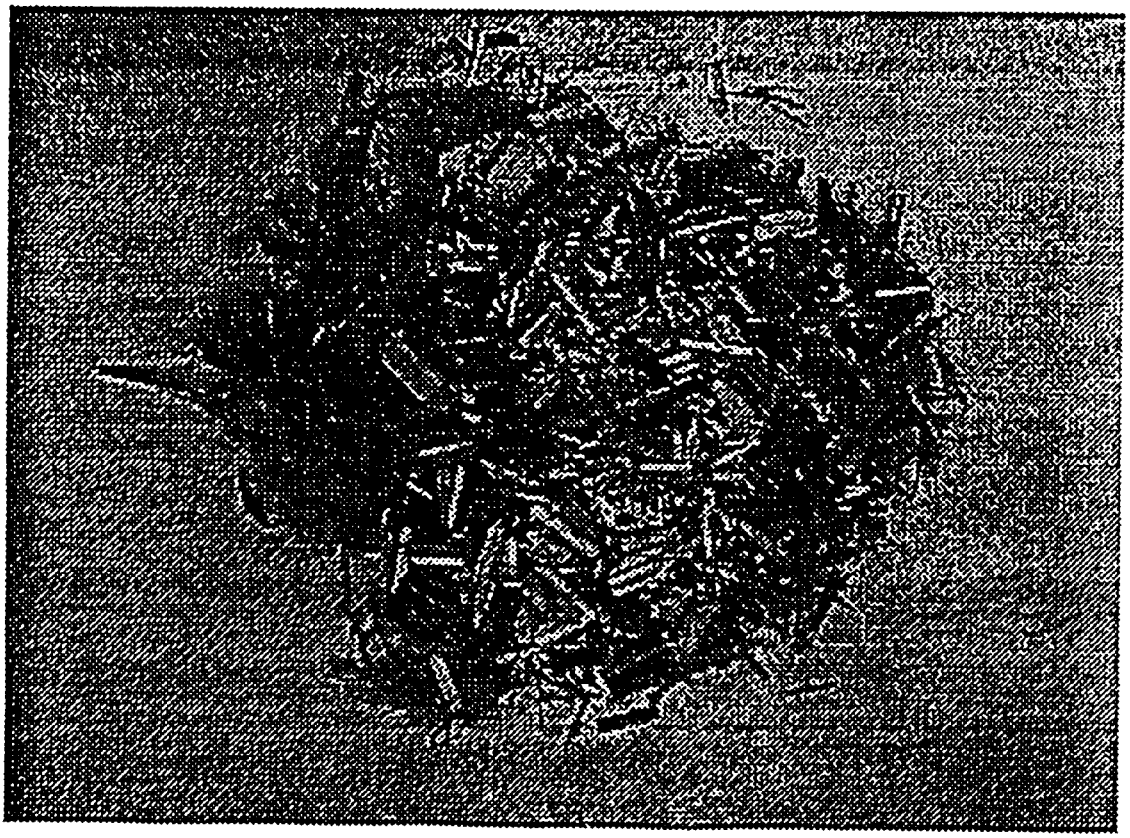
FIG. 3 is a photograph of chopped whole-stalk kenaf.
Figure 4:
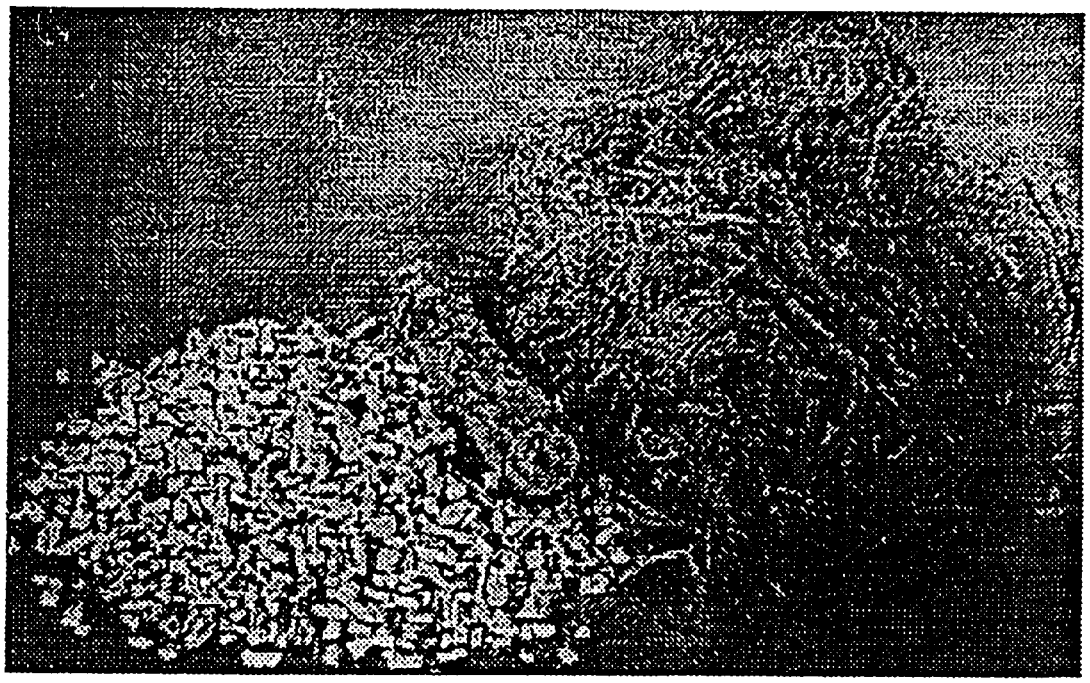
FIG. 4 is photograph of kenaf core (left), stalk (center), and bast fiber (right).

The terms bast medium and kenaf medium as used herein refer to chopped whole-stalk kenaf (*hibiscus cannabis*) that contains both bast and core fibers. (See FIG. 3). The bast fibers are composed of phloem bundles and have been used extensively in cordage, paper, and biodegradable grass mats. The core, or woody fibers, have been utilized in animal bedding and soil-less potting media. The core, shown on the left in FIG. 4, is a foam-like structure that has been used for the production of paper, animal bedding (absorbent) animal forage, chicken house litter, particle board (acoustic tiles), oil-absorbent materials (e.g., for oil spill cleanup), and potting soil.

Bast producing plants such as kenaf have many unique characteristics that make it ideally suited as a biological treatment medium. To begin with, bast producing plants have rapid growth and a high yield. For example, kenaf grows to a height of from 12–18 feet (3.66–5.49 m) in only 150 days and annually yields 5–10 tons (4.54–9.07 t)of dry fiber per acre. Additionally, bast fibers provide a high surface area for aerobic treatment and microbial attachment. Further, the bast core material accentuates the absorption of water and oil-based odor compounds. The core also provides micro-environments (10 micron tubules xylem vessels) suitable for anaerobic flora, thus providing a mechanism for anaerobic denitrification. Finally, most bast producing plants, such as kenaf, are relatively easy to grow, are drought tolerant, and require minimal pesticide and herbicide application.

In the BMBRTS, chopped whole-stalk kenaf both for both solid filtration and primary biological treatment. Thus, the BMBRTS contains both bast fibers and core. The kenaf plants are harvested with a standard forage harvester adjusted to produce fiber and core material approximately two inches (50.8 mm) in length. This length is preferred because it achieves excellent filtration and biological treatment characteristics while minimizing plugging.

While kenaf is the preferred bast producing plant, similar fibers may also come from roselle, flax, hemp, Chinese jute, jute, ramie, Sunn hemp, and nettle. The use of bast and core fibers from chopped whole-stalk kenaf for the attached growth medium does not preclude the usage of other bast producing plants for this purpose.

Because the biological material is kenaf, a cellulose-based fibrous plant, it is readily renewable. This allows the BMBRTS to function as a sustainable system. Once the bast medium fails (i.e., plugs), the kenaf reactor medium is removed and is used to produce a stabilized value added fertilizer or soil amendment via composting. This compost can then be efficiently exported from the animal production facility.

The BMBRTS is designed to be maintained with standard agricultural equipment such as tractors, forage harvesters, etc. Thus, the BMBRTS is purposefully simple, with very few moving parts and low maintenance requirements. The bast medium provides both aerobic and anaerobic biological treatment without the addition of fluidized bed reactors or submerged filter mediums which are used in many systems. The BMBRTS uses naturally occurring microorganisms to process the wastewater and reduce odor without the addition of costly chemical augmentation.

The BMBRTS is composed of five primary components. These are (1) a bast fiber screening filter (BFSF) for removal of settleable solids and some suspended solids, (2) a bast medium biological reactor (BMBR) designed to function as a modified attached growth biological reactor using chopped whole-stalk bast fiber and core as the attached growth medium, (3) an effluent holding reservoir (EHR) designed to serve as a pump, thereby providing primary clarification, (4) a recirculating pump to circulate wastewater through the various stages of the BMBRTS, and (5) a spent bast composting facility (SBCF) for stabilization of spent kenaf materials. A detailed description of the BMBRTS is set forth below.

Figure 1:
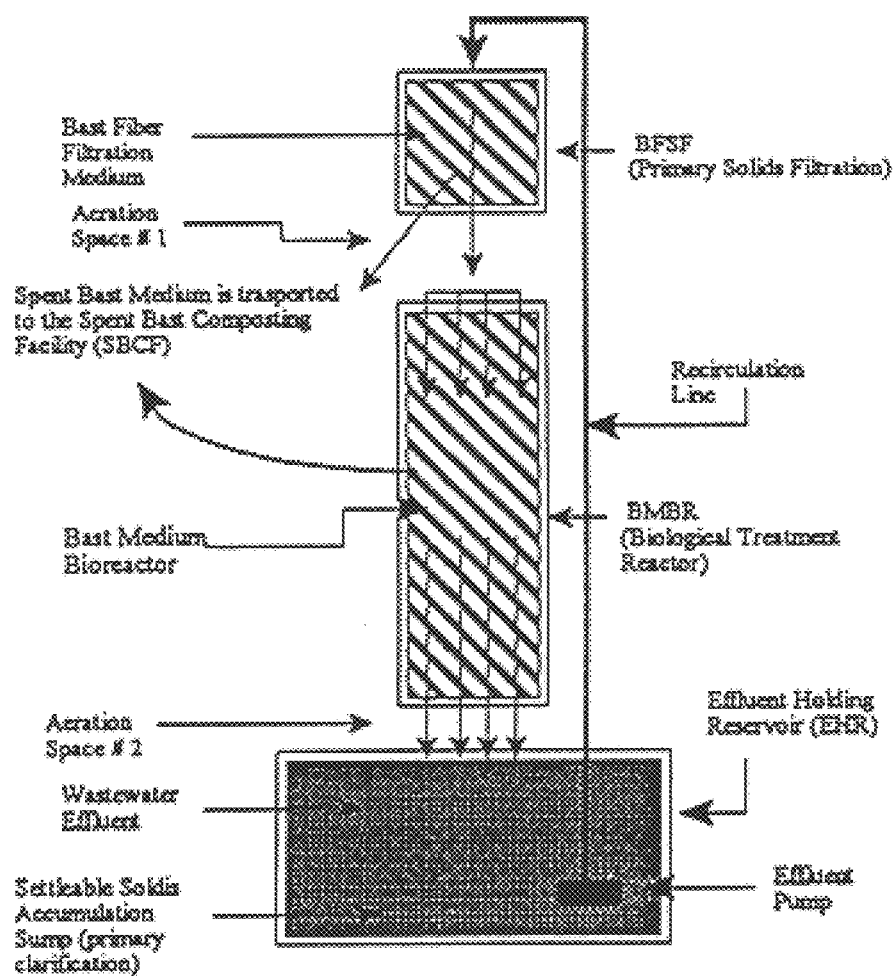
FIG. 1 is a schematic representation of the Bast Medium Biological Reactor Treatment System.

A schematic of the BMBRTS is shown in FIG. 1. Wastewater (feces, urine, and process wastewater) is collected in the effluent holding reservoir (EHR). The EHR provides primary clarification (via sedimentation) and storage of settleable solids for the BMBRTS.

The recirculation pump transfers wastewater from the EHR into the first treatment stage of the BMBRTS.

The first stage of the BMBRTS is composed of a bast fiber screening filter (BFSF). It removes settleable solids such as larger fecal solids, hair, and other solid particulate material. In addition, it removes some suspended solids from the wastewater. The BFSF is designed to function in a progressive failure mode, i.e., when the bast medium plugs, it is replaced with new bast medium and/or with renovated bast medium (i.e., recycled, desiccated bast medium). Clarified effluent from the BFSF then flows into the second stage of the BMBRTS.

The second stage is composed of a bast medium biological reactor (BMBR) that provides biological treatment through naturally-occurring aerobic, anaerobic, and facultative bacteria, fungi, algae, and protozoan microorganisms. In addition, some odorous compounds are absorbed by the plant core material. As effluent trickles through the BMBR via gravity, it is aerated and biologically treated. Effluent exiting the BMBR falls through an air space to increase droplet velocity and aeration, and splashes back into the EHR. Effluent is recirculated through the BMBRTS either continuously or on timed intervals (batched) to keep the microorganisms replenished. Water is added to the EHR to replace evaporative losses. Any additional wastewater and settled solids from the EHR are routed to an anaerobic or aerobic lagoon for biological treatment/storage prior to land application(at agronomic rates).

When the bast treatment medium from the BFSF or the BMBR becomes plugged either from solids or from microbial slimes, such that the flow through the BMBRTS is compromised, it is replaced with new and/or renovated bast medium (i.e., progressive failure). The spent kenaf medium is transferred to the spent bast composting facility (SBCF) to be composted. The spent bast material, with its resident microbial slimes and organic solids, provides the nitrogen and carbon essential for proper composting. The SBCF provides a low odor aerobic, low cost means of stabilizing waste constituents contained in the bast medium. The stiff bast fibers and tubular core material create tremendous pore space in the spent filter material. This further accelerates the composting process by providing air space throughout the compost pile (aerobic degradation). Any imbalances in the carbon:nitrogen ratio can be adjusted chemically by using standard agricultural fertilizer or organically to optimize the composting process. Non-toxic, stabilized compost is then utilized on-site for crop production or exported off-site as a value-added plant fertilizer and/or soil amendment.

Having generally described this invention, a further understanding can be obtained by reference to certain specific examples which are provided herein for purposes of illustration only and are not intended to be limiting unless otherwise specified.

EXAMPLES

Odors, such as those from intensive swine production facilities, are difficult to measure and quantify. Today, the human nose remains the most sensitive instrument available to qualify and quantify. (Nicolai, R. E., Managing Odors from Swine Waste, Department of Biosystems and Agricultural Engineering, Minnesota Extension Service, University of Minnesota, Publication AEU-8, 1998). Numerous researchers are seeking to develop electronic devices capable of accurately measuring odors; however, none of these devices have been sensitive enough to be used reliably in the field. Until a standard quantitative instrument is developed, human panels must be used to characterize the odors.

Example 1

Wastewater Solution for Lab-Scale BMBRTS

A swine waste solution including both feces and urine was prepared for each batch test of the BMBRTS. The swine waste was collected from the Mississippi Agricultural and Forestry Experiment Station (MAFES) Swine Unit located in Starkville, Miss.

Modeling the system for large scale swine production facilities, the mass of swine manure and urine excreted by a 90 kg finishing pig is approximately 5.9 kg per day (MWPS-18, *Livestock Waste Facilities Handbook,* Iowa State University, 1985). Hereafter, the term "manure" will represent the total mass of feces and urine from the animal per unit of time. A typical finishing facility has about 880 head. Therefore, the daily manure production from a typical finishing house is 5,192 kg per day (880×5.9 kg/day=5,192 kg/day). Finishing barns, in this region of Mississippi, typically utilize a pit-recharge type of waste storage/removal. A typical facility has about 340,687 L of wastewater beneath the slatted floor. While the pit volume can be fresh water, the general practice is to use recycled anaerobic lagoon effluent in the pits.

By dividing the daily manure production (5,192 kg) by the volume of wastewater (340,687 L) in the pits beneath the slats, a manure to pit volume ratio of 0.015 kg manure/L of pit wastewater is calculated. The laboratory-scale BMBRTS has a capacity of 18.9 L [5 gal] of wastewater in the effluent holding reservoir (EHR). Using the manure (kg)/pit volume (L) ratio calculated above, it follows that 0.29 kg of swine manure must be added to 18.9 L to achieve a manure/pit volume ratio for one day of operation. To make certain that the concentration of manure in the EHR was representative of an actual swine finishing facility, 0.35 kg (120% of the 0.29 kg) of swine manure was added to each EHR (18.9 L) for all batch runs reported in this experiment.

The waste solution was prepared by first collecting a bulk quantity of swine waste from the Mississippi State University (MSU) Swine Unit. Ten individual reactors were used in this test. In order to create a homogenous waste solution, 3.5 kg [7.9 lb] of waste was weighed in a 18.9 L bucket using a Circuits and Systems Model SX-1002 Electronic Scale. Water was added to the manure and stirred to create a slurry (breaking up most of the fecal solids). The slurry was then strained using a #8 U.S. Standard Sieve with openings of 2.36 mm [0.937 in]. This operation removed undigested feed (cracked corn, etc.) and other large solids. The strained slurry was then mixed with water to a volume of 18.9 L. Each EHR was filled with tap water to 17 L. The strained slurry solution was divided into 1.9 L volumes while vigorously stirring the contents. This helped ensure that the initial concentration of manure in each EHR was homogeneous.

Olfactory Evaluation

Odor evaluations were completed for each batch-run experiment during this study. Odor evaluations were conducted using accepted sensory descriptive practices (Meilgaard et al., *Sensory Evaluation Techniques,* 2nd ed., CRC Press, Inc., Boston, 1991). All odor evaluations were done within 2 hours of retrieving the samples from the lab-scale BMBRTS. Approximately 10 mL of wastewater from the effluent holding reservoir (EHR) of each lab-based BMBRTS was placed in individual 250 mL Nalgene Teflon FEP One-Piece Wash Bottles. These bottles are highly resistant to absorption/adsorption of liquids or gases (odorants). The internal draw tube was removed from each bottle to keep the liquid portion 5 of the treatment sample from escaping into the cap (neck). The bottles were then wrapped in aluminum foil and randomly numbered (i.e., double-blind study). A small piece of glass wool was inserted into the neck of the stem each time the Teflon bottles were used. In order to reduce the effect of olfactory dulling, only 8–10 samples were analyzed during each meeting for both training and testing periods. After each testing period, all bottles were washed with soap and water, thoroughly rinsed, and placed in a 100° C. evaporating oven for approximately 15 hours to ensure odor free bottles for the next testing period.

A human olfactory panel consisting of 12 volunteers was established for the study. Panel members were randomly selected from various Departments at Mississippi State University. The panel was trained for approximately 2 months, meeting 3 times weekly. During these weekly meetings, various swine waste samples were introduced to the panel, from which 9 descriptive terms were chosen to describe the odor. The terms chosen were as follows: overall intensity, acridity, sulfurous, earthy, musty, fecal (skatole/cresol complex), cheesy/dirty socks, sweet/grainy, and ammonia. Each term was rated on a 0 to 15 point scale, with 0 being no delectable odor and 15 being a strong odor. Fecal (skatole/cresol complex), ammonia, and sulfur standards (dimethyl trisulfide) were prepared and tested by the panel during the training period. A numerical value was assigned to the fecal standard [a mixture of p-cresol (210 mg/L) and skatole (12.8 mg/L) in deionized water] and all unknown odor samples were then graded against the standard. All odor samples taken from the control and treatments were duplicated and assigned different random numbers for olfactory panel analysis.

To evaluate a sample, the panelist swirled the bottles to fill the bottle headspace with odorants and gently squeezed the bottle in a series of small pulses to force the odorant laden air out of the bottle to an area beneath the nose and above the lip (being careful not to allow the bottle to touch any portion of the panelist's face). The panelist then recorded their response to the odorant on the score sheet.

Olfactory Panel Results

The human olfactory panel evaluated samples treated by the BMBRTS for odor at periods of 2, 24, and 48 hours, and this data is shown in Tables 2, 3, and 4 respectively. Data was analyzed using SAS ver 6.12 (SAS Institute Inc.) and means were separated by performing the Duncan's Multiple Range test. All statistical comparisons were at the $P=0.05$ level. For the odor defined as "musty," none of the treatments were significantly different from the control (anaerobic pit) at the 2, 24, and 48 hour test periods. The odors defined as "cheesy" and "sweet" were not significantly different from the control at the 24 and 48 hour test periods. In discussions with the panelists, none of these terms (musty, cheesy, and sweet) were thought to be definitive in describing the odors encountered during this study. The mean response (on a scale of 0–15) for the initial wastewater sample (t =0) was as follows: intensity (5.3), acrid (1.0), sulfur (1.6), earthy (0.48), musty (1.1), fecal (2.3), cheesy (0.62), sweet (0.32), and ammonia (0.49). Thus, the intensity of the swine odor was the dominant component identified by the odor panel. While odor intensity is the dominant odor component, acrid, sulfur, and fecal components also shaped the odor profile of the influent at t=0.

After 2 hours of treatment, the odor intensity was statistically different for all treatments versus the control. The mean odor panel response and statistical inferences are shown in Table 2. The fecal odor component was statistically different from the control in all of the treatments except the K15 after 2 hours of recirculation. With regard to the sulfurous odor component, the two high (190 L/hr) flow rates (K50 & B50) were statistically different from the control at 2 hours.

After 24 hours of treatment, there were some notable changes in the odor components as determined by the panelists. Specifically, across the board reductions in ammonia, sulfurous content, acridity, overall intensity, and fecal (skatole/cresol complex) content. Table 3 contains the mean odor panel response and statistical inferences for samples evaluated after 24 hours of recirculation. In particular, the mean odor response for both kenaf treatments (K15 & K50) was statistically different from the control. The mean odor intensity value for the K15 and K50 treatments was 3.35 and 3.29, respectively, which is about half of the mean odor intensity recorded for the control (control mean odor intensity=6.62). It is notable that in Table 3, the mean response on the fecal odor component is the lowest for the kenaf treatments. It is also notable that after 24 hours, the kenaf treatments (K15 & K50) have taken on a decidedly "earthy" odor component. The mean "earthy" odor response for both kenaf treatments (K15 & K50) is the highest among the treatments after 24 hours. This is very important, since it indicates that an odor easily identifiable with "swine" was modified such that it was difficult for panelists to associate the odor with "swine". In addition, the "earthy" odor character combined with less "fecal" odor may be deemed less objectionable than in the anaerobic pit (control). This is the primary factor in the design and development of the BMBRTS, e.g., changing the odor character to one that cannot be associated with "swine".

The kenaf treatments were significantly different after 48 hours of recirculation from all other treatments for overall odor intensity and the odor component "earthy". In particular, results after 48 hours of recirculation (Table 4) show that the "earthy" odor component of the kenaf treatments (K15 & K50) had the highest mean value of the treatments. In addition, the mean "fecal" odor response for the kenaf treatments is the lowest of all treatments. However, they are not significantly different from the bioring treatments ( B15 & B50). For the "intensity" odor component, the kenaf treatments have a higher mean response than the bioring treatments. With regard to mean odor intensity, the kenaf treatments are significantly different from the bioring treatments, and all treatments are statistically different from the control. The mean intensity value of the kenaf treatments is about half of the control value (mean odor intensity=6.16). There are no statistically significant differences between the bioring and kenaf treatments for acrid, ammonia, fecal, and sulfur odor components.

The results show that, based on mean response, the anaerobic (control) pit had the highest mean odor intensity at all sampling periods (2, 24, and 48 hours), with kenaf treatments next, and lastly the bioring treatments. This result is positive, since the higher odor intensities obtained from the kenaf treatments is likely tracking the increase in the earthy character imparted by the kenaf. This "odor character" was changed by the bioring and kenaf treatments to a point that virtually removes any association with swine odor. In particular, the kenaf treatments transformed the odor components associated with swine waste from a highly intense, acrid odor comprised of sulfurous, fecal, and ammoniacal components into an odor predominately comprised of an "earthy" character (similar to the odor of freshly tilled soil).

Wastewater Sample Analysis

Wastewater samples were taken from the sumps (EHR) of the laboratory-scale BMBRTS. Labeled 500 mL Nalgene field sample bottles were submerged into each respective EHR and allowed to fill with effluent. Samples were analyzed by trained technicians in Agricultural & Biological Engineering (ABE) Water Quality Laboratory at Mississippi State University. The lab performed the following tests: ammonia, $BOD_5$, (5-day biological oxygen demand), COD (chemical oxygen demand), ortho phosphorus (orth-P), pH, total Kjeldahl nitrogen (TKN), total phosphorus (TP) in Kjeldahl digest, total solids (TS), and volatile solids (VS). Table 1 describes the instrumentation protocol for each analyate. When necessary, samples were preserved using concentrated sulfuric acid in combination with refrigeration. Samples were analyzed for $NH_3$, TKN, TP, TS, and VS within 7 days, unless they were stabilized with sulfuric acid, in which case, they were analyzed within 28 days. Wastewater samples were analyzed for ortho-P within 48 hours and COD within 24 hours.

Water Quality Results

Extensive water quality analysis was completed during this study. The experimental design yielded 10 wastewater samples for each sampling interval. Samples were retrieved at 0, 2, 4, 6, 24, and 48 hours for a total of 60 samples during each batch run. Each wastewater sample was analyzed for ammonia, $BOD_5$, COD, ortho-P, pH, TKN, TP, TS, and VS. Each batch run required approximately 300 man-hours of laboratory time for analysis.

Tables 5 and 6 contain the $BOD_5$ and COD composite data. For the K50 treatments, the $BOD_5$ was reduced by about 90% after 6 hours of recirculation. During the same time interval, the high flow rate bioring (B50) treatment only achieved a 61% reduction in $BOD_5$. At the completion of the batch run (48 hours), both the bioring and kenaf treatments had removed over 90% of the influent $BOD_5$. The control (anaerobic pit) had an average $BOD_5$ reduction of only 29% during this same time period (48 hrs). The COD values showed similar trends with the kenaf and bioring treatments both achieving over 85% reduction in COD in 48 hours. The COD for the control was reduced by about 47% during the same time interval.

Figure 5:
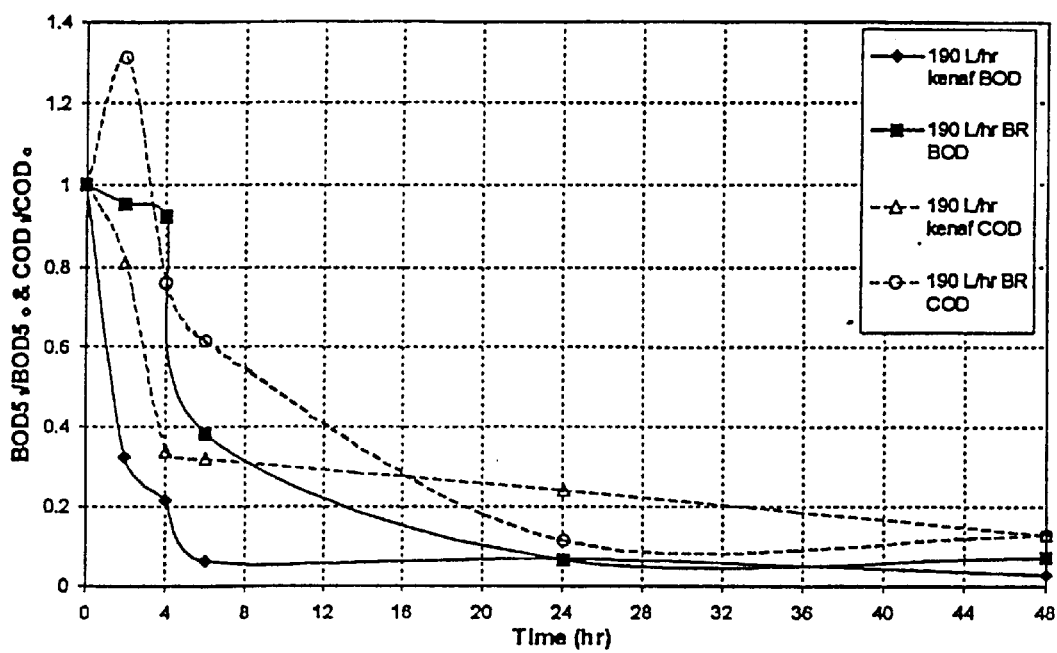
FIG. 5 is a graphical illustration of 190 L/hr $BOD_5$ and COD values for kenaf and bioring reactors over time.
Figure 6:
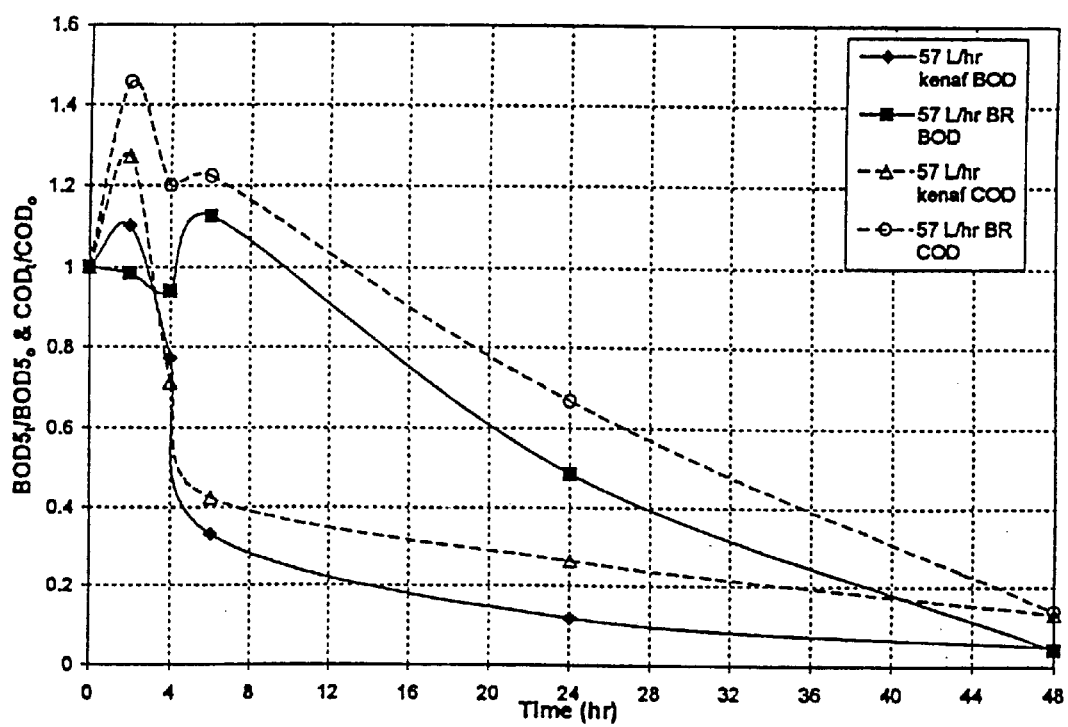
FIG. 6 is a graphical illustration of 57 L/hr $BOD_5$ and COD values for kenaf and bioring reactors over time.
Figure 7:
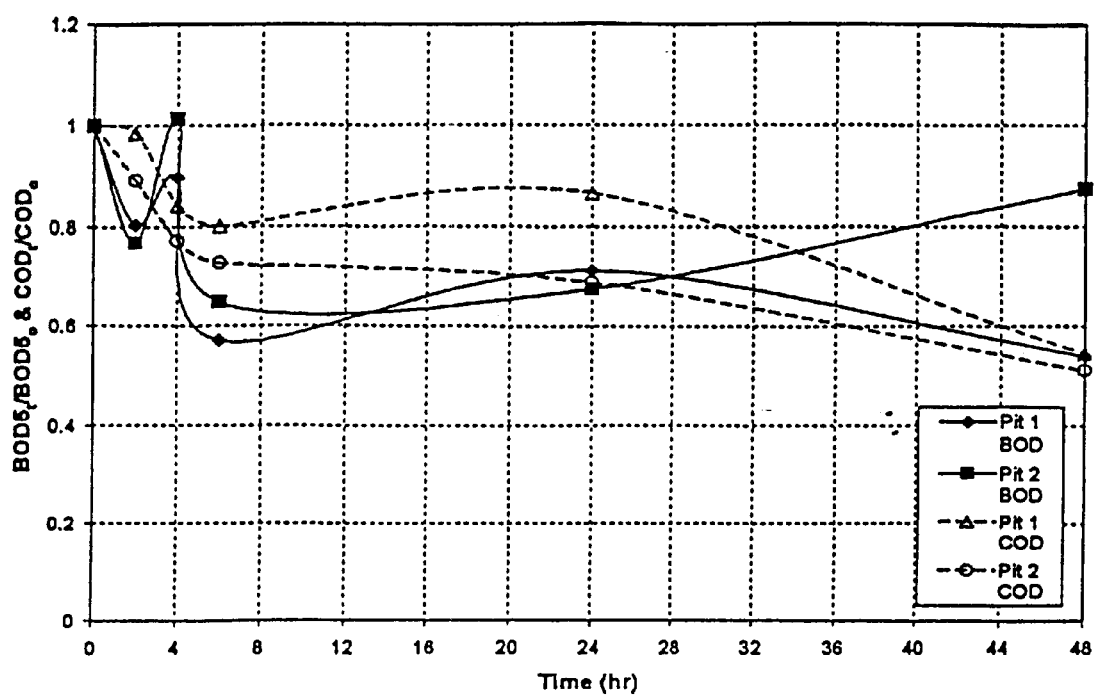
FIG. 7 is a graphical illustration of $BOD_5$ and COD for the control (anaerobic pit simulator) over time.

FIGS. 5, 6, and 7 show the $BOD_5$ and COD values over time for the 190 L/hr flow rate (B50 & K50), the 57 L/hr flow rate (B15 & K15), and the control, respectively. In general, the higher flow rates (190 L/hr) resulted in better treatment efficiencies for both the bioring and kenaf treatments. However, the low flow rate (57 L/hr) kenaf treatment outperformed the high rate (190 L/hr) kenaf treatment in COD reduction after 24 hours of recirculation. The 190 L/hr flow rate kenaf treatment shows the largest reduction in $BOD_5$ and COD after 2, 4, and 6 hours of recirculation. The K50 $BOD_5$ concentrations after only 6 hours of recirculation were 143 and 61 mg/L, respectively. At the same time interval, the high and low flow rate bioring treatments were 385 and 1050 mg/L, respectively. FIGS. 5 and 6 show that the $BOD_5$ and COD for the bioring and kenaf treatments are about the same after 48 hours of recirculation (no additional manure added during the 48 hour test period). After 24 hours of recirculation, at the 57 L/hr flow rate, the kenaf treatment is superior to the bioring treatment. However, this advantage diminishes after 48 hours.

Figure 8:
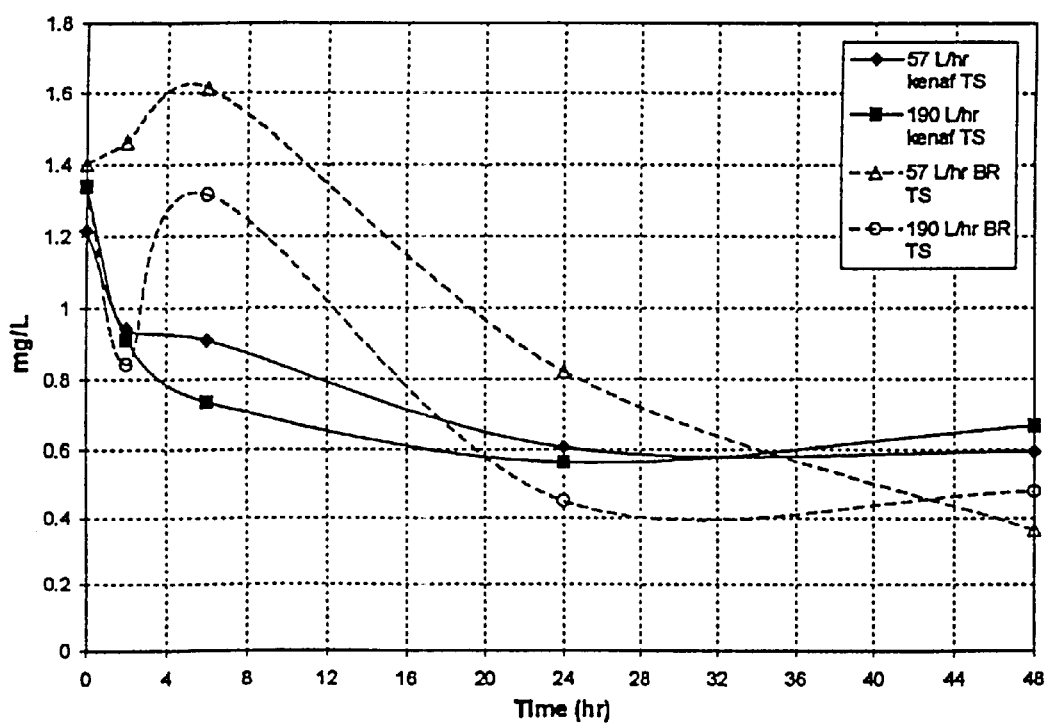
FIG. 8 is a graphical illustration of the total solids data versus time for kenaf and bioring reactors.
Figure 9:
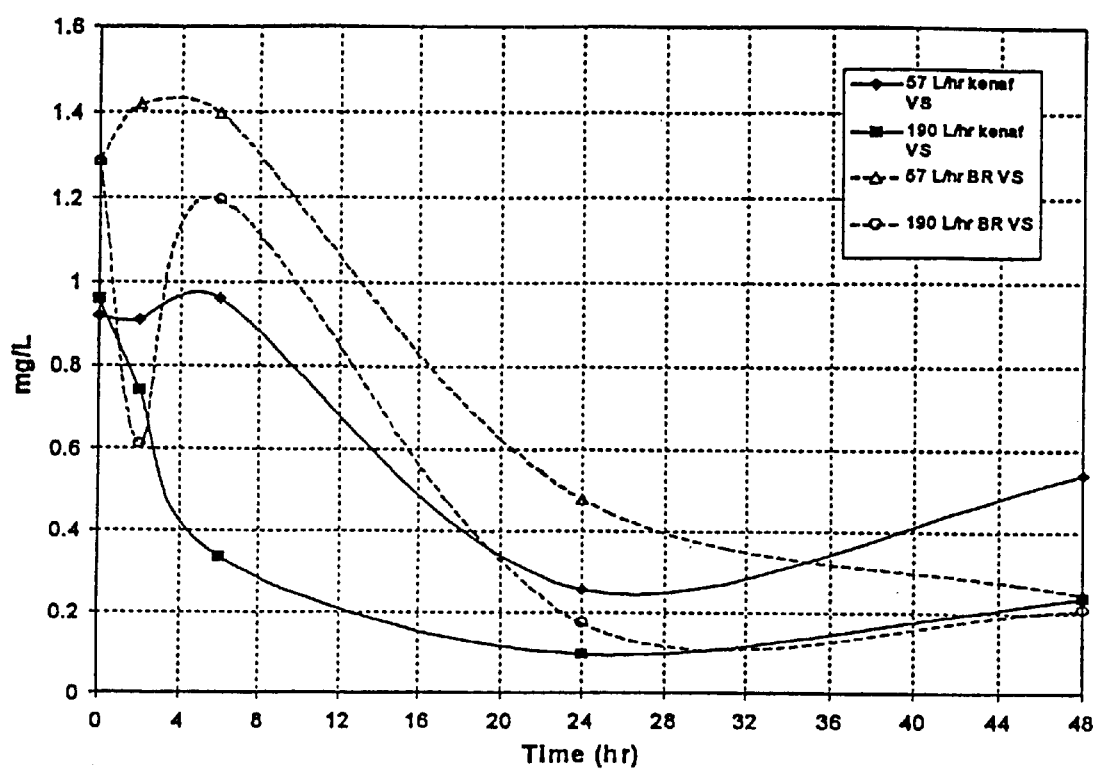
FIG. 9 is a graphical illustration of the volatile solids data versus time for kenaf and bioring reactors.

Tables 7 and 8 contain the total solids and volatile solids data. FIGS. 8 and 9 show the TS and VS data versus time for the kenaf and bioring treatments. The kenaf and bioring treatments both reduced the TS and VS; however, the bioring treatments outperformed the kenaf treatments. This may be due to fragments of kenaf (a cellulose-based plant) being entrained in the wastewater, thus increasing the TS and VS concentration. This cannot occur with the biorings, since they are made from synthetic material.

Figure 10:
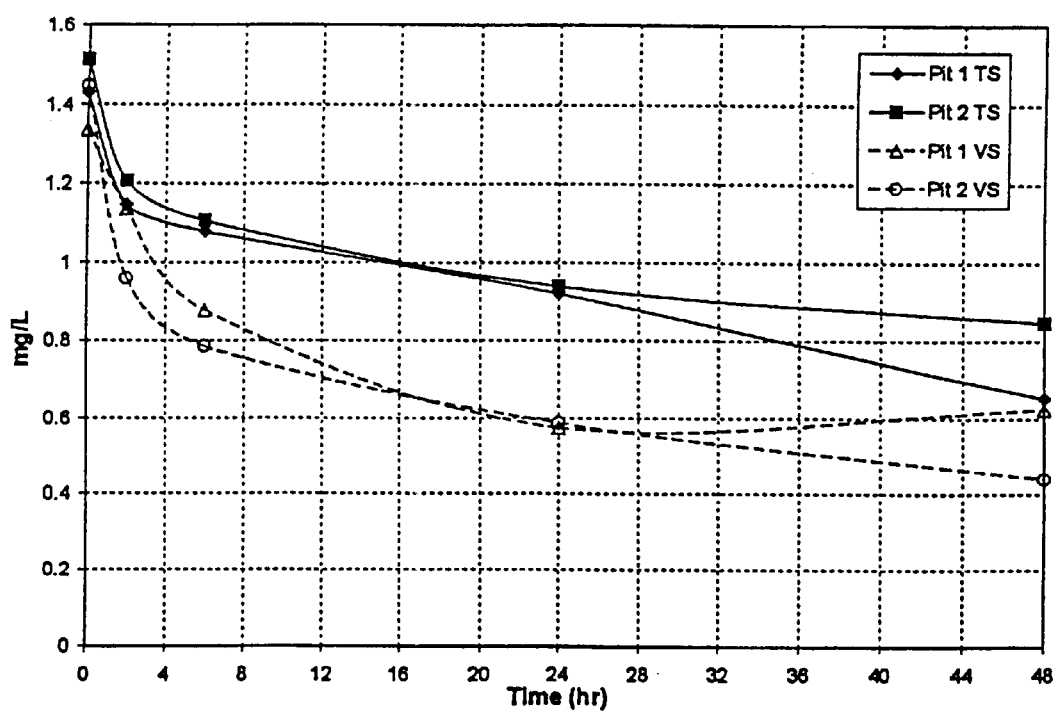
FIG. 10 is a graphical illustration of the total and volatile solids data versus time for the control (anaerobic pit).

The TS and VS data for the control (FIG. 10) are somewhat misleading, since the EHRs were not agitated during the 48 hour test period. Thus, the manure solids were allowed to settle in the EHR. The values reported in Tables 7 and 8 are from wastewater samples taken from the supernatant of the control EHR. If the manure solids were re-suspended by stirring, the TS and VS concentrations would likely have been much higher than that which is reported in Tables 7 and 8. In contrast, the bioring and kenaf treatments were continuously agitated by the recirculation pumps. Thus, the reduction in TS and VS for these treatments is due predominantly to microbial degradation for the biorings, whereas the kenaf medium provides both microbial degradation and particle entrapment (filtering).

The pH of the environment is a key factor in the growth of organisms. Most bacteria cannot tolerate pH levels above 9.5 or below 4.0. Generally, the optimum pH for bacterial growth lies between 6.5 and 7.5 (Metcalf & Eddy, Inc., 1991). Periodic measurements of pH during this study found that this was not a limiting factor for biological growth (pH ranged from 6.8 to 7.2).

Example 2

Water Chemistry

Wastewater Parameters

Water from the BMBRTS was analyzed for total solids (TS), volatile solids (VS), ammonium ($NH_4$), and chemical oxygen demand (COD). Total solids, volatile solids, and ammonia parameters were analyzed according to Standard Methods, 17th Ed. The COD was determined using the modified Hach Company's modified closed reflux, calorimetric procedure. The following list gives the specific procedure used for each wastewater parameter tested.

| | |
|---|---|
| Total solids dried at 103–105° C. | 2540 B |
| Volatile solids ignited at 550° C. | 2540 E |
| Ammonium ($NH_4$) Method | 4500-NH4 C Nesslerization Analyzed on a Spectronic 601 @ 450-nm |
| COD Colorimetric | Hach Co., Closed Reflux, Analyzed on Hach DR/890 Colorimeter |

All samples were processed within the time limits associated with that particular analyate.

Odor Assessment Procedure

Sample Preparation

To begin the experiment, a sample of raw swine was obtained from a Mississippi State University swine facility.

The waste sample contained both solid (feces) and liquid (urine) constituents. This raw waste sample was then mixed with a small amount of tap water in order to dissolve the feces and give a "worst-case" approximation of an in-barn waste pit. The wastewater sample, hereafter effluent, was then strained through a ⅛ inch (approximate) steel mesh to remove all large particulate matter, mostly undigested feed. This effluent was used in all treatments with the exception of the "positive-control", which was pure tap water. A sample of the effluent was then taken to serve was the "negative-control" for the odor panel testing. Of the remaining effluent, 7.5 gallons was added to approximately 25 gallons of clean tap water in a basin and allowed to continuously recirculate through the BMBRTS. A separate wastewater basin was filled with 25 gallons of tap water and 7.5 gallons of effluent (prepared using the same method as before) to simulate a standard anaerobic wastewater pit (e.g., this was the control treatment). Approximately 6 hours later, samples were taken from the EmR of the BMBRTS-treated wastewater basin and control wastewater basin.

Sample Presentation and Evaluation

Sample preparation consisted of pipetting 50 ml of each sample into large, plastic weighting pans. The pans containing the individual samples were then separated by approximately 3-feet, so that odor emanating from adjacent pans did not intermingle. During this odor intensity testing, six samples were evaluated. These samples were:

1. Samples consisting of only pure water (positive-control).
2. A raw swine wastewater mixture (influent used in the odor intensity experiment).
3. BMBRTS-treated sample (unagitated)—taken from the effluent holding reservoir.
4. BMBRTS-treated sample (agitated)—taken from the effluent holding reservoir.
5. Untreated (agitated)—taken from the control wastewater pit.
6. Untreated (unagitated)—taken from the control wastewater pit.

The odor evaluation volunteers were students, faculty, and staff from the Agricultural & Biological Engineering (ABE) Department, Mississippi State University. These volunteers had no formal odor identification training. The odor evaluation volunteers were at no time in physical contact with the swine waste. The subjects were blindfolded and directed to each of the pre-arranged containers by a research technician. At each of the six containers (treatments), the subject was asked to evaluate the odor level according to the scale set forth in Table 9.

Four volunteers from ABE evaluated the samples at each time point in the study. Prior to the test, each subject was asked to answer a series of questions. The questions were as follows: 1) Are you familiar with the odor associated with swine waste? 2) Are you familiar with other livestock odors? 3) What is your gender? 4) What is your age? 5) Do you currently have any respiratory problems? 6) Do you consider yourself to be in good health? 7) Do you have any objections to participating in this study? Once these criteria were answered, the test was allowed to proceed.

To begin the test, subjects were allowed to smell a positive control sample (pure water) and a negative control sample (concentrated swine waste). They were then told that the positive control sample would be evaluated as a 1 on a scale of 1 to 5 and that the negative control sample would be rated a 5 on a 1 to 5 scale of odor assessment. The test subject was then randomly led to each test sample two times, thus giving 2×replication at each sampling trial.

Waste Loading Determination for Laboratory-Based BMBRTS

By modeling the waste content of a commercial swine production facility utilizing a pit-recharge waste handling system, the amount of manure (based on MWPS-18) and urine produced in a three day period was placed in a five gallon container (sump). Dividing this amount into five dilutions (100%, 80%, 60%, 40%, and 20%), and circulating these dilutions through the kenaf bioreactors for 2 days helped establish an optimum loading rate for the kenaf bioreactors.

Using the waste loading experiment described above, an optimum waste percentage through the kenaf bioreactors was determined. After analyzing the data, the 40% waste solution (i.e., 40% of the manure and urine a 200 pound pig produces in three days mixed in a five gallon bucket with water) was selected as the most compatible for using biorings and kenaf as treatment mediums.

Flow Rate Optimization

Once the optimum waste percentage was determined, optimum flow rates to achieve the best treatment of the wastewater was determined by conducting a 4×2 block-experiment using various flow rates with the 40% waste solution.

After examining the data, the high flow rate (50 gph) and the low flow rate (15 gph) provided the maximum treatment efficiencies of 81% and 84%, respectively. Several factors separate the two treatments in both the short-term and long-term applications. Initially, the high flow rate provides more cycles of the wastewater through the bioreactor as well as increased aeration of the wastewater. This results in better treatment efficiencies in the short-term application, although, as stated earlier, the endpoint treatment efficiencies are almost identical. A possible detriment of the high flow rate could potentially be a reduced life span of the bioreactor as a result of clogging due to increased pressure on the reactor media.

Total Solids

Figure 11:
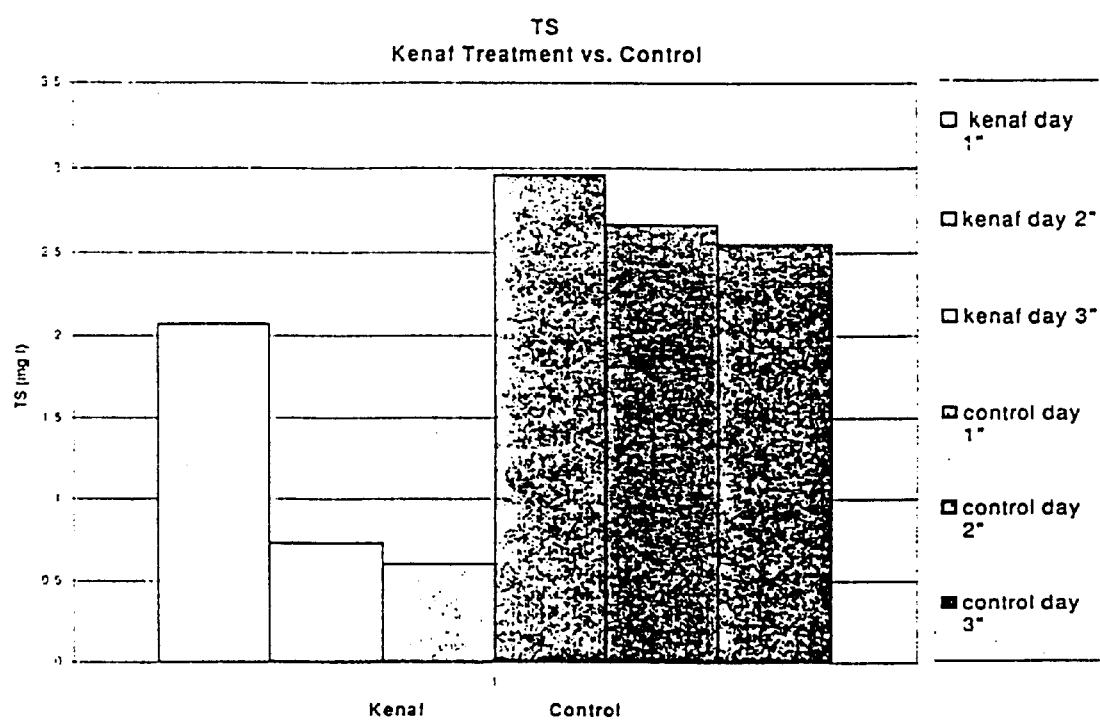
FIG. 11 is a graphical illustration of the total solids in BMBRTS vs. control for a three day period.

Ninety total solids (TS) samples were collected from the bioreactor treatments, and eighteen TS samples were collected from the control (anaerobic pit simulator), during a three day period for two separate test runs. The initial and final weights of the samples were averaged to give an average reduction value. Influent TS concentrations for the bioreactor and control were determined to be 2.08 and 2.48 mg/L, respectively. Final (effluent) TS concentrations for the bioreactor and control were determined to be 0.654 and 2.32 mg/L, respectively. The reduction of TS for the bioreactor treatments was approximately 69%, while the control decreased approximately 6%. See Table 10 and FIG. 11 for data associated with TS.

Reduction of TS is important because it gives an overall indication of the mechanical screening capability of the kenaf bioreactor to remove solids. Therefore, kenaf may be useful as a pretreatment for producing an effluent that can be used in a biological treatment process.

Volatile Solids

Figure 12:
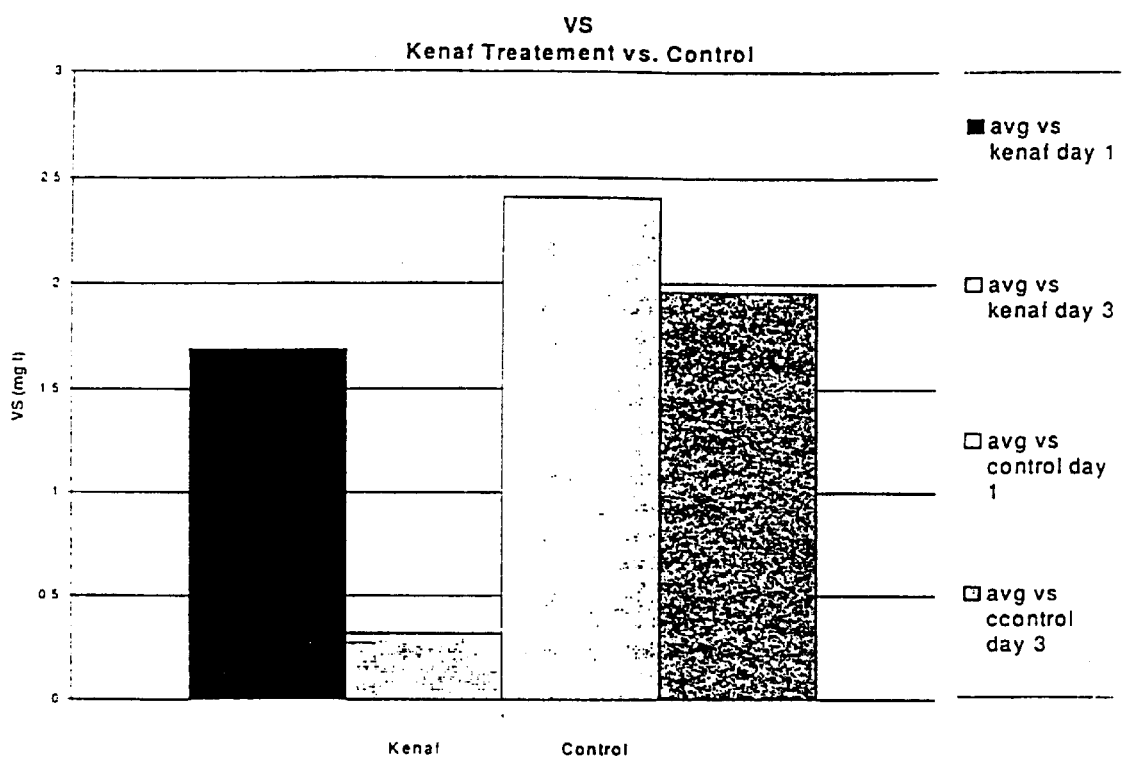
FIG. 12 is a graphical illustration of the volatile solids in BMBRTS vs. control for a three day period.

Sixty volatile solids (VS) samples were collected from the bioreactor treatments, and twelve VS samples were collected from the control (anaerobic pit simulator) during a three day period for two separate test runs. The initial and final weights of the samples were averaged to give an average reduction value. Influent VS concentrations for the bioreactor and control were determined to be 1.66 and 1.97 mg/L, respectively. Final (effluent) VS concentrations for the bioreactor and control were determined to be 0.348 and 1.79 mg/L, respectively. The reduction in VS for the bioreactor treatments was approximately 79%, while the VS for the control decreased approximately 9%. See Table 11 and FIG. 12 for VS data.

Volatile solids concentration plays a major role in sizing anaerobic lagoons. By reducing VS, it may be possible to reduce the treatment volume of these lagoons. Hence, the acreage for land application of the wastewater and the scale of irrigation equipment may be reduced. These reductions would serve to reduce the capital cost associated with the land application of lagoon effluent.

Ammonium ($NH_4$)

Figure 13:
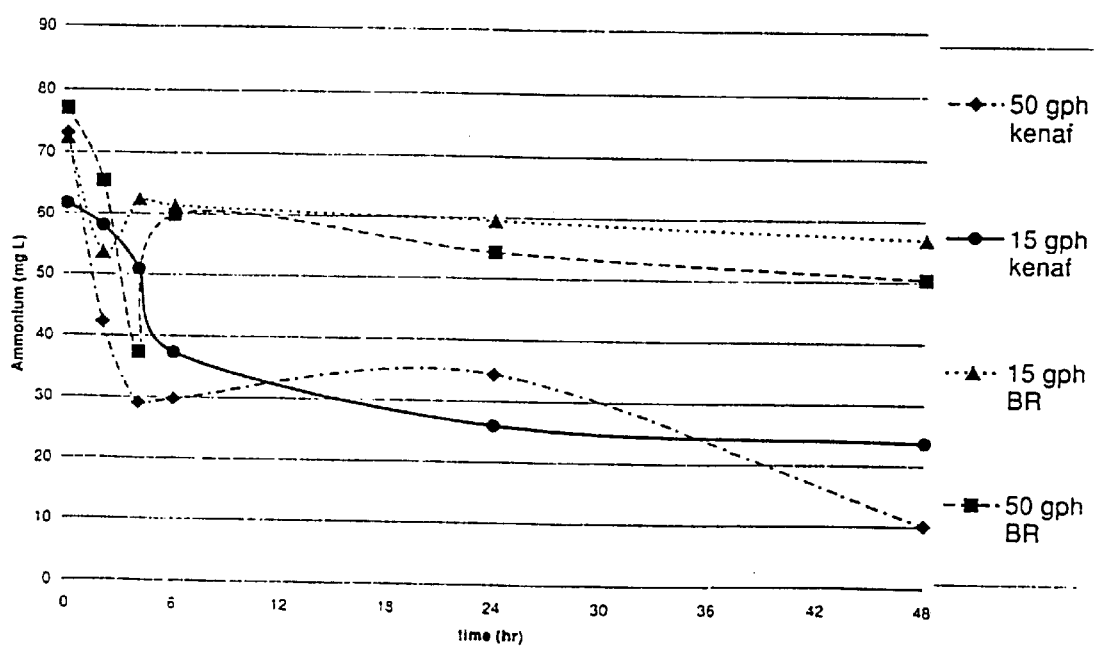
FIG. 13 is a graphical illustration of ammonium vs. time for kenaf and bioring mediums (15 and 50 gph).

Twenty-four ammonium ($NH_4$) samples from the bioreactor treatments (high rate and low rate), twelve samples for the control (anaerobic pit simulator), and twelve samples from two bioreactor treatments (high rate and low rate) packed with conventional biorings (plastic media) were collected during a three day period. See Table 12 and FIG. 13 to view the influent and effluent ammonium concentrations for each treatment.

Reduction efficiencies for the treatments were determined to be (approximately):

| Kenaf Bioreactor | |
|---|---|
| High Rate | 86% |
| Low Rate | 61% |
| Anaerobic Pit Simulator | |
| Rep 1 | 21% |
| Rep 2 | 21% |
| Bioring Reactors | |
| High Rate | 26% |
| Low Rate | 35% |

This data indicates that the kenaf medium may have an advantage over plastic mediums and standard anaerobic pits in removing ammonium from swine wastewater. Reduction in ammonium in the wastewater is important because it is the precursor to the formation of gaseous ammonia ($NH_3$). This is important in intensive swine production facilities because in-house air quality affects human workers in the housing facility, swine growth rates, and overall respiratory health.

COD Results

Chemical oxygen demand (COD) is a measure of the organic content of wastewater.

Figure 14:
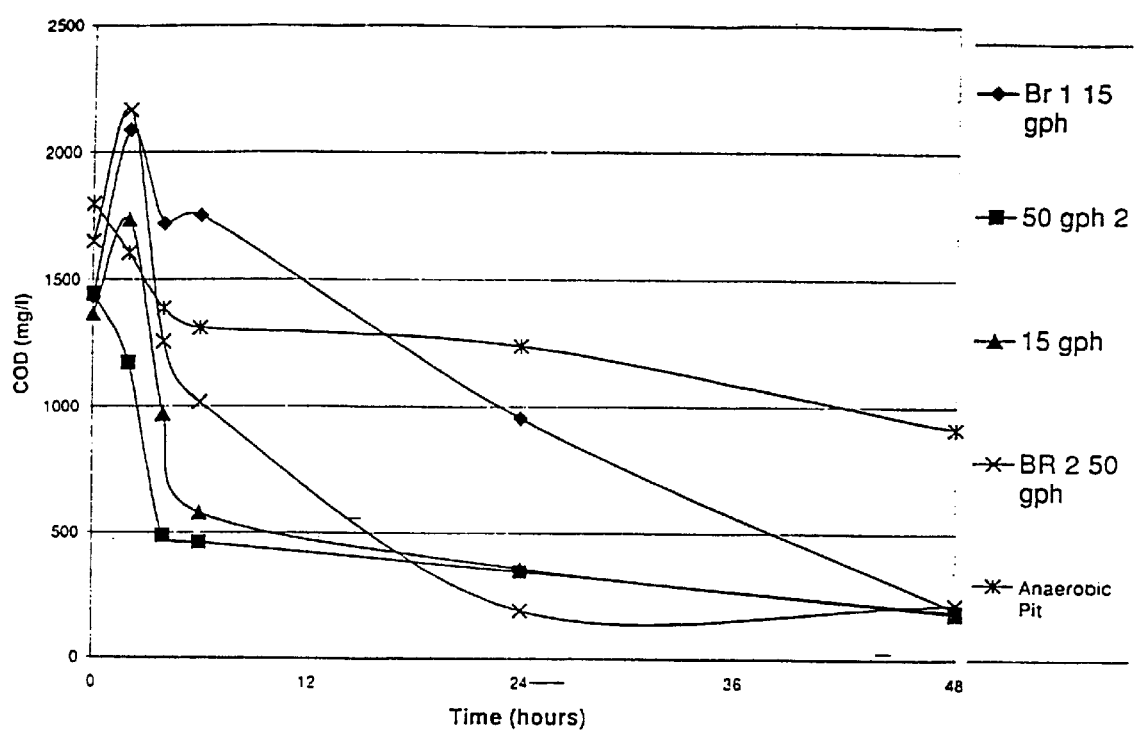
FIG. 14 is a graphical illustration of COD vs. time for kenaf, bioring, and anaerobic pit mediums (15 and 50 gph).

The reduction of the organic content (measured by COD) is the benchmark for determining the performance of any organic waste treatment system. Twenty-four COD samples were collected from the kenaf bioreactor treatments (12 high rate and 12 low rate samples). Twelve samples from the control (anaerobic pit simulator) and twelve samples from the two bioring (plastic media) treatments (6 high rate and 6 low rate samples) were taken. All of the samples were collected during a three day period. See FIG. 14 to view the COD versus time for the 48-hour treatment period. Reduction efficiencies for the treatments were determined to be (approximately):

| Kenaf Bioreactor | |
|---|---|
| High Rate | 87% |
| Low Rate | 87% |
| Anaerobic Pit Simulator | |
| Rep 1 | 46% |
| Rep 2 | 49% |
| Bioring Reactors | |
| High Rate | 87% |
| Low Rate | 86% |

This data indicates that there is no appreciable difference in COD removal between the kenaf medium and the plastic medium after 48 hours of treatment. However, the kenaf medium produced a better COD reduction efficiency after 6 hours of treatment than either the plastic medium or the anaerobic pit.

Odor Assessment

Figure 15:
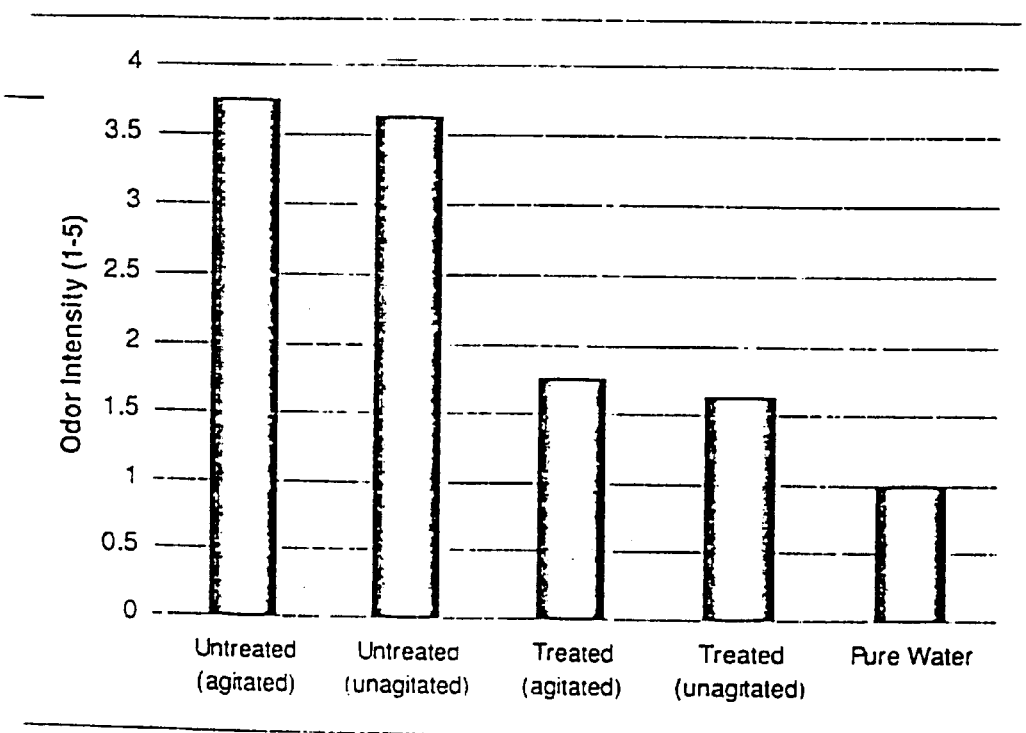
FIG. 15 is a graphical illustration of the odor response from preliminary testing of the Bast Medium Biological Treatment System.
Figure 16:
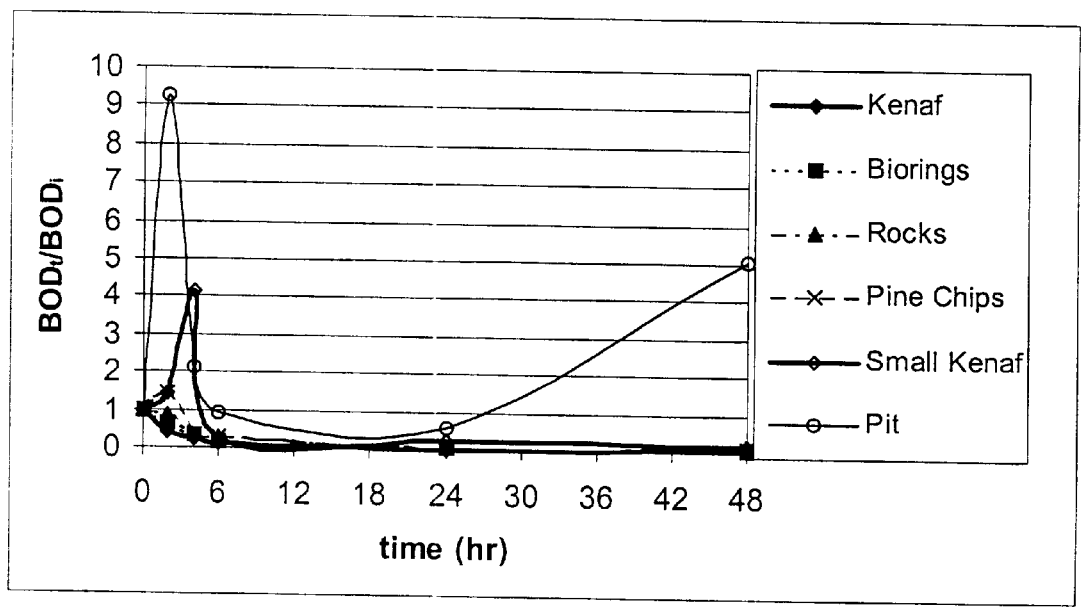
FIG. 16 is a graphical illustration of the $BOD_5$ data for treatments expressed as a ratio of $BOD_5$ at time t/$BOD_5$ initial.
Figure 17:
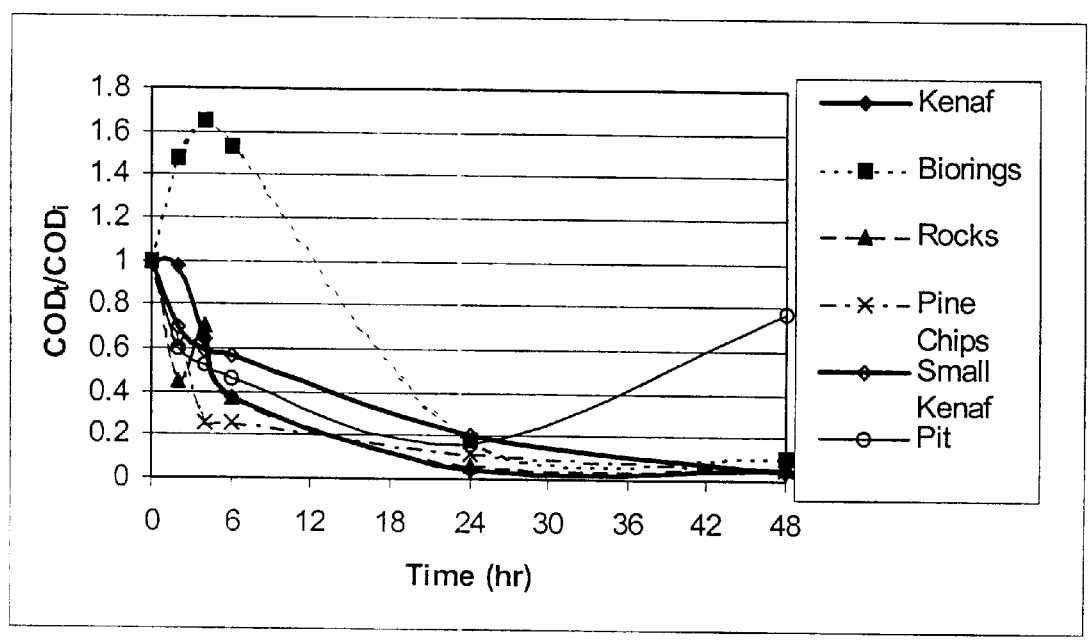
FIG. 17 is a graphical illustration of the COD data for treatments expressed as a ratio of COD at time t/COD initial.
Figure 18:
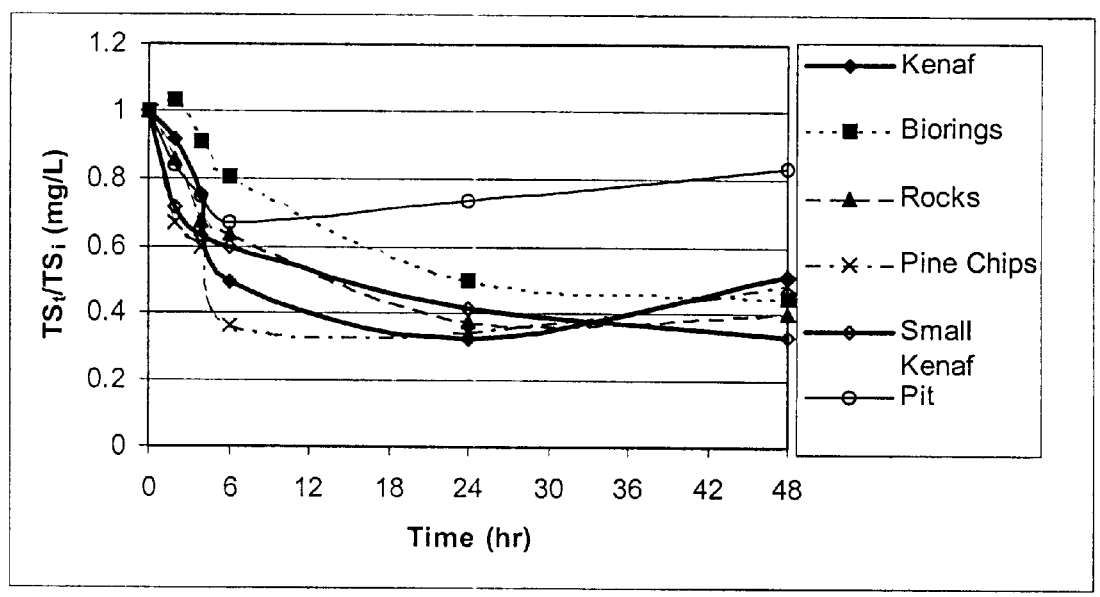
FIG. 18 is a graphical illustration of the total solids data for treatments expressed as a ratio of TS at time t/TS initial.
Figure 19:
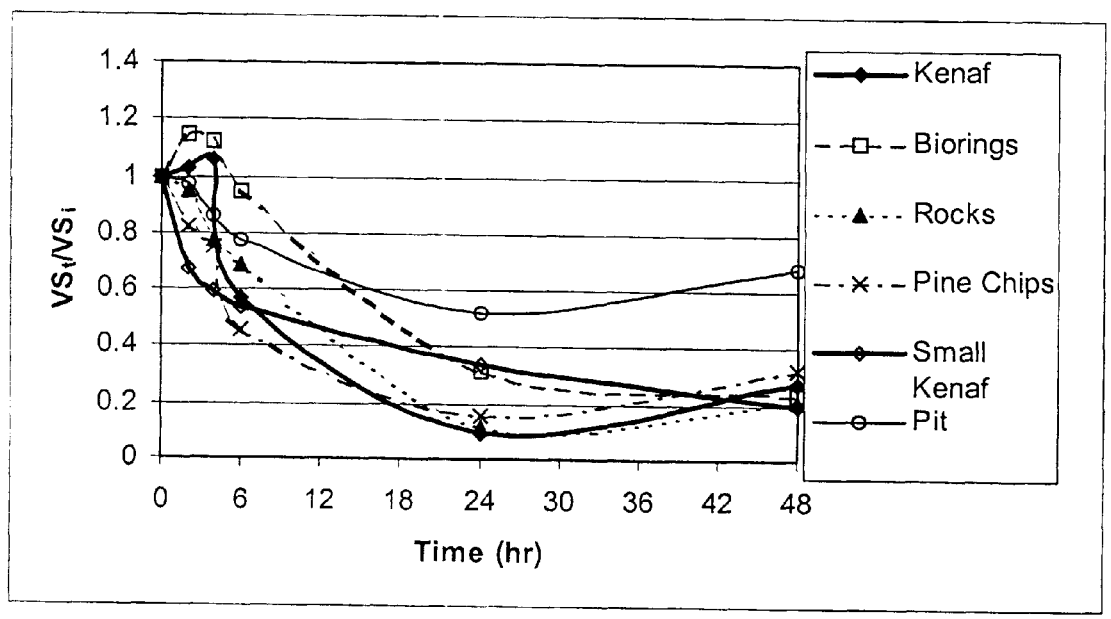
FIG. 19 is a graphical illustration of the volatile solids data for treatments expressed as a ratio of VS at time t/VS initial.
Figure 20:
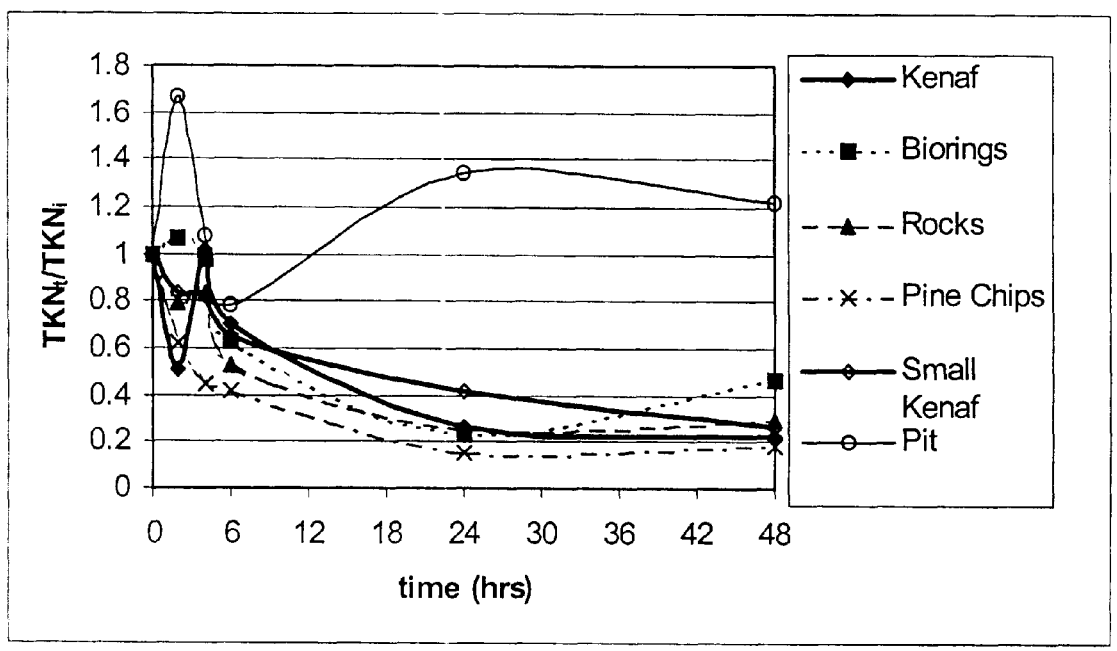
FIG. 20 is a graphical illustration of the total kjeldahl nitrogen (TKN) data for treatments expressed as a ratio of TKN at time t/TKN initial.
Figure 21:
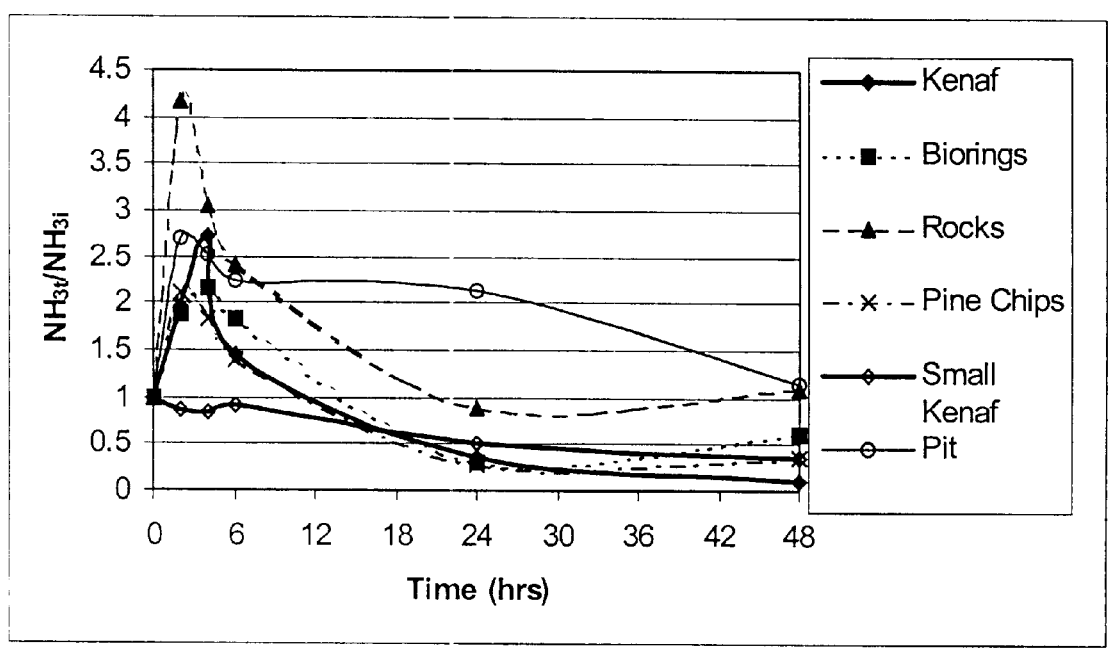
FIG. 21 is a graphical illustration of the ammonia ($NH_3$) data for treatments expressed as a ratio of $NH_3$ at time t/$NH_3$ initial.
Figure 22:
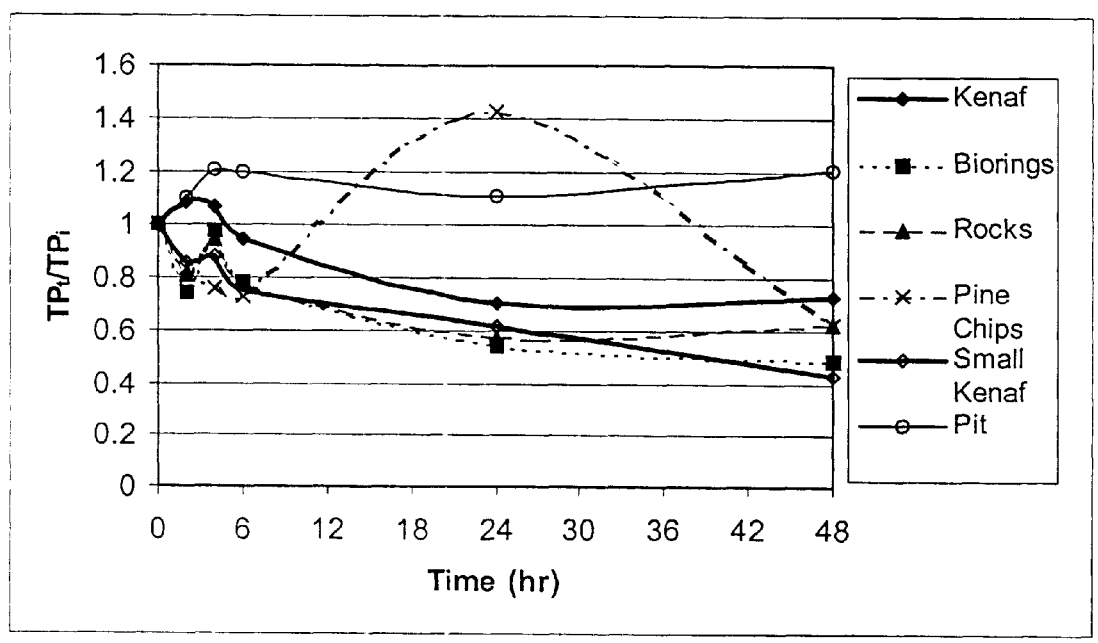
FIG. 22 is a graphical illustration of the total phosphorous (TP) data for treatments expressed as a ratio of TP at time t/TP initial.
Figure 23:
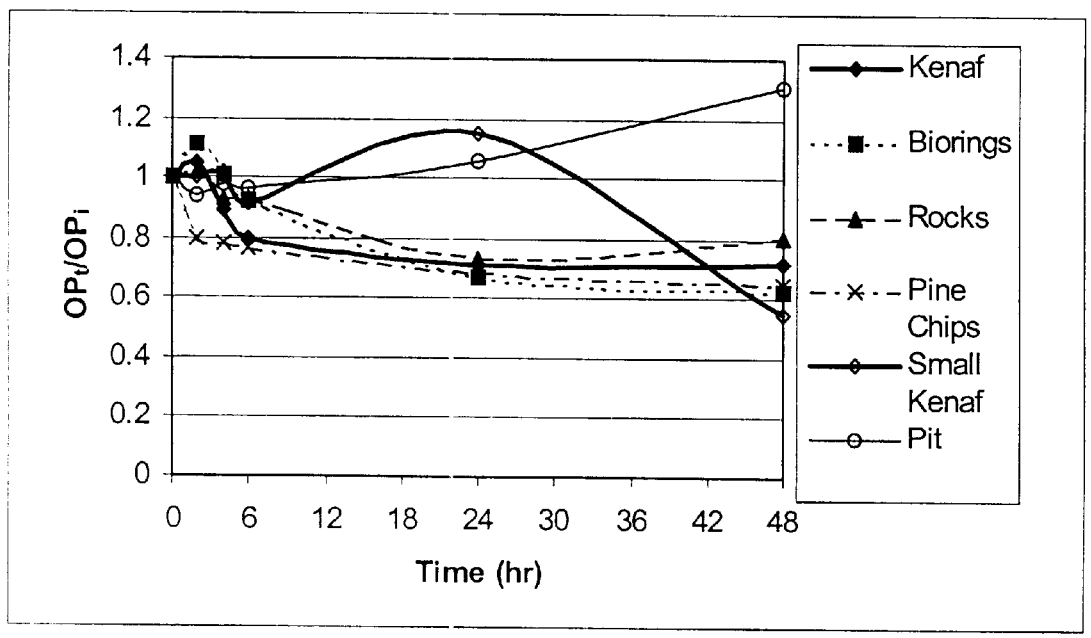
FIG. 23 is a graphical illustration of the ortho-phosphorous (OP) data for treatments expressed as a ratio of OP at time t/OP initial.

Data collected from each volunteer during the odor evaluation stage was compiled to give an average odor intensity response. Unagitated samples were collected from the supernatant liquid on the top of the pit. Agitated samples were collected from the top of the pit after the pit had been thoroughly stirred to re-suspend the settled solids. The data in FIG. 15 shows that the untreated waste samples, both agitated and unagitated, averaged approximately 3.7 points out of a 5 point scale. This can be quantified as from no to faint odor. The control, pure water, registered 1 out of a 5-point scale (i.e., no odor). Therefore, the data shows that wastewater treated by the BMBRTS registered, on average, 2 points less than the untreated wastewater and one half a point above the pure water sample.

Example 3

Laboratory Scale Comparison of Kenaf versus Conventional/Non-Conventional Attached Growth Media This experiment was conducted at the Agriculture and Biological Engineering Wastewater Research Facilities at Mississippi State University during the month of September, 1999. The purpose of this experiment was to evaluate the odor reduction and water treatment capacity of kenaf compared to other attached growth media (rocks, biorings, and pine chips) and standard treatment schemes (anaerobic pit) for use in the treatment of swine wastewater. The different media selected for use can be classified into three major categories: 1) Conventional, 2) Non-conventional, and 3) Standard treatment schemes. Further, these categories can be broken into two sub-classes: 1) Abiotic and 2) Biological. Conventional media would be those media that have been well studied and used in wastewater treatment. Non-conventional media would be those media that have not been well studied or are not currently in widespread use. Standard treatment schemes would refer to the anaerobic pit method currently used at most swine operations in Mississippi and around the Southeast United States. The sub-classifications abiotic and biological refer to the origin of the media. For example, river rocks are not produced by biological processes and biorings are synthetic (i.e. plastic). Thus, these are classified as abiotic. Pine chips and kenaf are harvested from living organisms, and are therefore classified as biological.

Experimental Setup and Procedures

Figure 2:
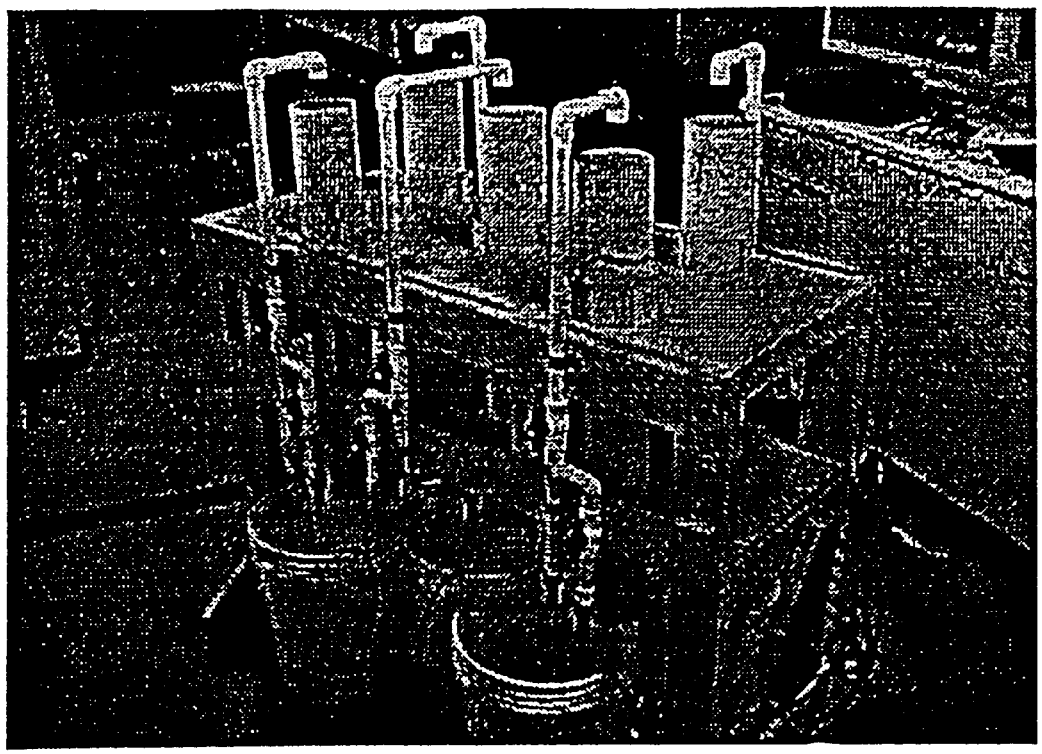
FIG. 2 is a photograph of a laboratory-based Bast Medium Biological Reactor Treatment System.

This experiment follows upon the same lines as the experiment presented in Example 1 set forth above. FIG. 1 of Example 1 represents the general treatment scheme for all media used, with the exception of the anaerobic pit. FIG. 2 of Example 1 is a picture of the laboratory apparatus used for this experiment. The experiment was conducted in a 6×2 configuration, i.e., six treatments (kenaf, small kenaf, rocks, biorings, pine chips, and pit) with two replications. Each reactor, referred to in FIG. 1 of Example 1 as the BMBR, was filled with the same volume of the selected media. The wastewater solution, olfactory evaluation, and wastewater sample analysis were each conduced as previously stated in Example 1. Samples were collected from the EHR of each treatment at timed intervals of 0 (initial), 2, 4, 6, 24, and 48 hours of treatment. Parameters measured for each sample were odor, $BOD_5$, COD, TS, VS, TKN, $NH_3$ (ammonia), TP, and OP. Acronyms for the treatments in this experiment are as follows: Pine chip, PC; Kenaf, K; Rocks, R; Biorings, BR; Pit, Pit; Small Kenaf, SK. The small kenaf treatments utilized the same volume of kenaf as the kenaf treatment (K), but was placed in a larger diameter container such that the cross-sectional area was increased.

Results and Discussion

Waste Water Analysis

The raw data and treatment efficiencies for each water quality component measured is presented in Tables 13 through 28. Further, the average data (expressed as a ratio of the component at time t versus the initial value of the component) for each water quality component is graphically presented in FIGS. 16 through 23.

In order to simplify the discussion of these results, a comprehensive ranking system based on treatment efficiencies at the 24 and 48 hour sampling intervals has been devised. This ranking system does not imply a statistically significant difference between the treatments analyzed. The basis for this system is as follows. First, the treatments are ordered by treatment efficiency from highest to lowest. Next, the treatments are assigned a ranking from 1 to 6 (1 being the best, or highest treatment efficiency; 6 being the poorest, or lowest treatment efficiency). These rankings are given for each water quality component measured, and can be viewed in Tables 29 (24 hour) and 30 (48 hour), respectively. Further, the rankings for each treatment are totaled for each water quality component measured. Finally, the totals are ranked from 1 to 6, using the procedure stated previously. This was repeated for the 24 and 48 hour sampling intervals. These final rankings were then totaled and an average rank was computed. Hence, the treatments with the lower average rankings performed better. This data is expressed in Table 31.

The final ranking from best to poorest wastewater treatment is as follows: kenaf, pine chips and biorings (tie), small kenaf, rocks, and lastly the anaerobic pit simulator. While these results show that the kenaf media was the best media analyzed, viewing the data tables and graphs shows that there is little or no difference in end-point treatment of the swine wastewater. Therefore, it can be stated that kenaf performed as well as, and in some cases, better than the other conventional and non-conventional media.

Olfactory Evaluation

Olfactory evaluation procedures have previously been discussed in Example 1. Of note, odor data for the small kenaf (SK) treatment was not taken due to laboratory constraints. The pine chip (PC) data at t=24 hours was missing. Tables 32, 33, and 34 present the mean panelist response for each treatment and odor component as well as statistical inference of the data. As stated in Example 1, Duncan's Multiple Range test was used to compute statistical inference.

Table 32 presents the olfactory evaluation results at t=O hours of treatment. As the data shows, there is no major statistical difference in any of the treatments. Table 33 presents the olfactory evaluation results at t=24 hours of treatment. The data shows that for the odor components intensity, acridity, musty, fecal, and cheesy the anaerobic pit simulator (Pit) is significantly different from all other treatments. Further, for the same components, kenaf is not significantly different from any other conventional or non-conventional media tested. The earthy component data shows that kenaf was significantly different from all other treatments tested, including the anaerobic pit simulator. The odor component $NH_3$ (ammonia) is not significantly different for any treatment, although it must be noted that the olfactory panel did not detect any ammonia in the kenaf (K) and bioring (BR) treatments.

Table 34 presents the olfactory evaluation results at t=48 hours of treatment (i.e., the endpoint of the experiment). Data for the odor components intensity, acridity, sulfur, fecal, and cheesy show that the anaerobic pit simulator (Pit) was significantly different from all other treatments tested. Further, odor intensity was not significantly different between the kenaf (K) and bioring (BR) treatments, both of which scored in the lower mean response group. The data for the odor component earthy shows that the pine chip (PC) treatment was significantly different from all other treatments tested. Further, the kenaf (K) and rock (R) treatments ranked second to the PC treatment in mean response. The data for odor component musty shows no significant difference between any of the treatments tested. The data for odor component fecal shows that the anaerobic pit simulator (Pit) scored the highest mean response and was significantly different from all other treatments tested. The rock treatment (R) scored second in mean response and was significantly different from all other treatments. Finally, the kenaf (K), bioring (BR), and pine chip (PC) treatments were in the lowest mean response group for the fecal component and were not significantly different from each other. There was no significant difference between any treatment for the ammonia ($NH_3$) odor component.

In summary, the data shows that all treatments, excluding the anaerobic pit simulator (Pit), reduced the fecality, sulphurous, and acridity components as well as the overall intensity of the swine wastewater. Further, this data demonstrates that the kenaf media performed as well as, and in some cases better than the conventional and non-conventional media used for comparison.

Example 4

Pilot Scale Bast Medium Biological Reactor Treatment System

Figure 24:
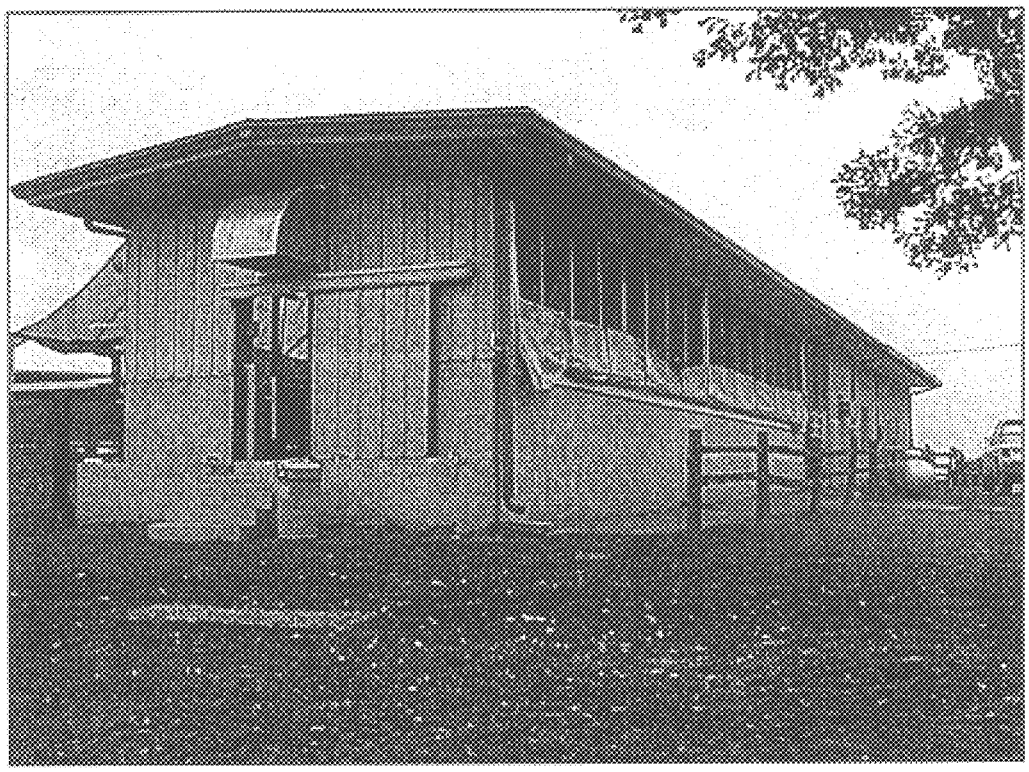
FIG. 24 is a photograph of the Mississippi Agriculture and Forestry Experiment Station Swine Physiology Facility.
Figure 25:
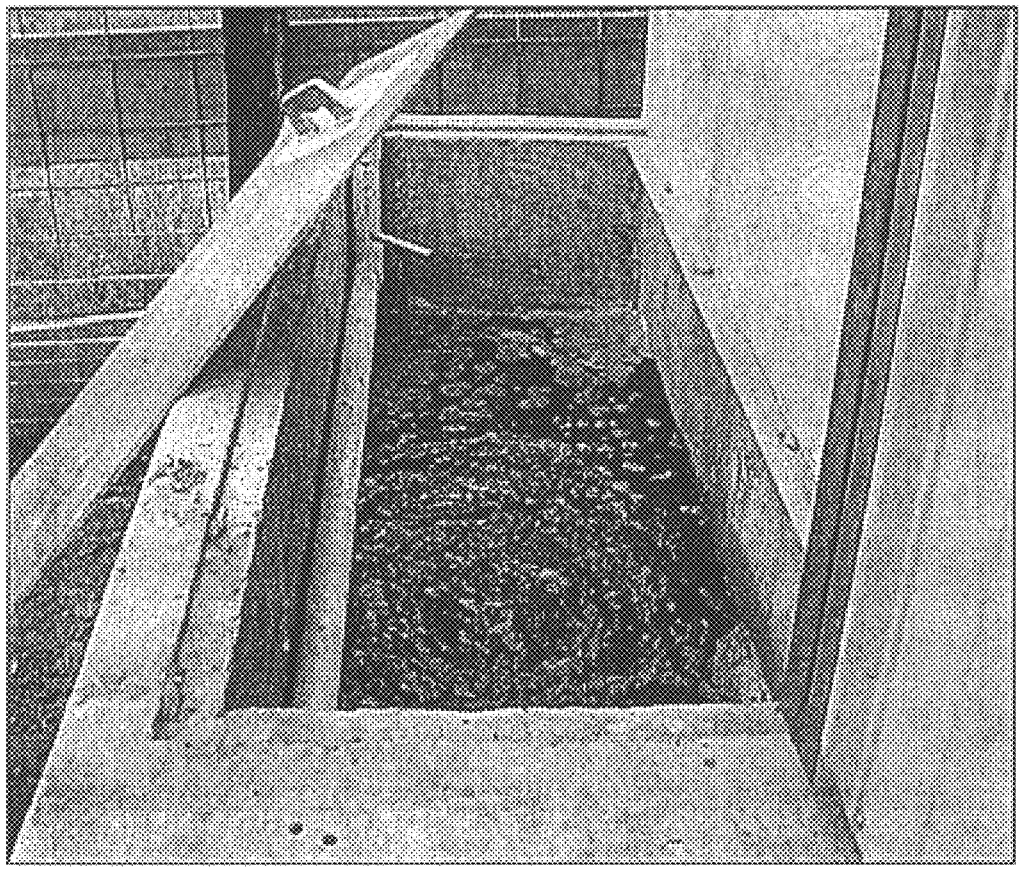
FIG. 25 is a photograph of the wastewater collection pit serving as the EHR.
Figure 26:
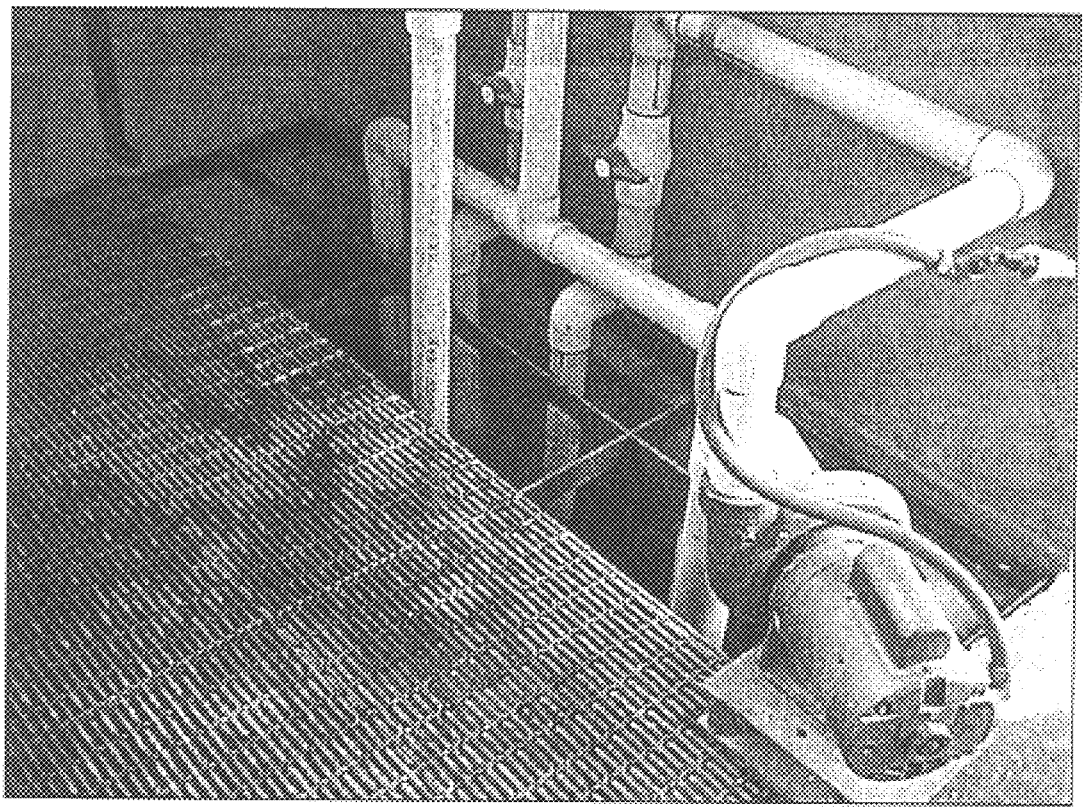
FIG. 26 is a photograph of the recirculation pump for the pilot scale BMBRTS.
Figure 27:
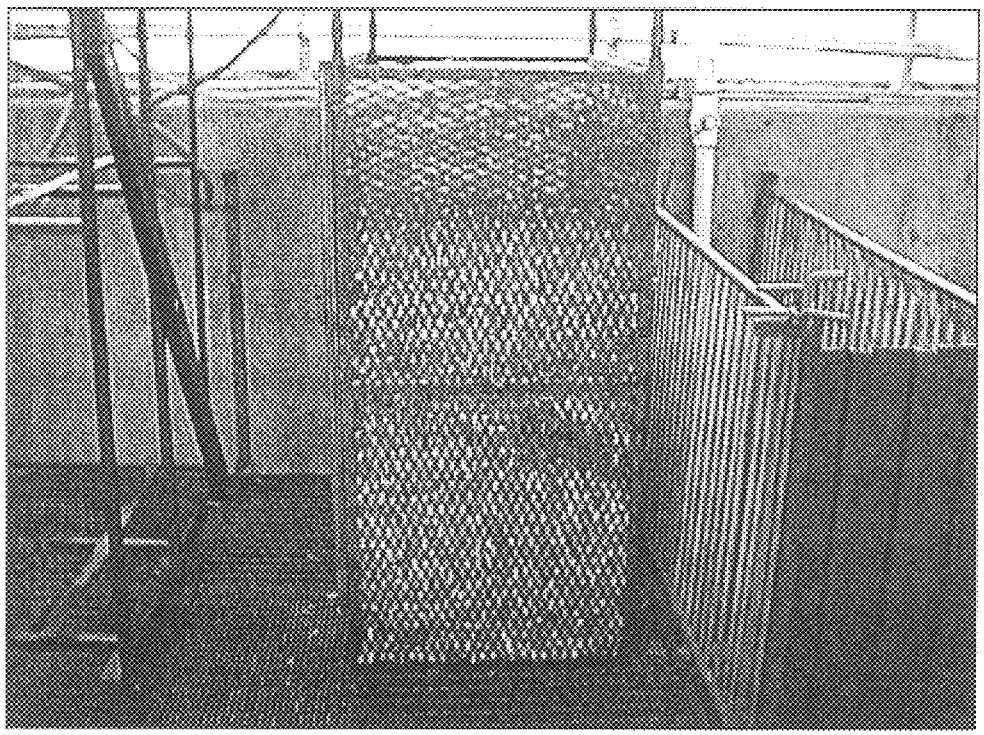
FIG. 27 is a photograph of the Bast Medium Biological Reactor (BMBR) for the pilot scale BMBRTS.

A pilot scale BMBRTS was implemented in a small swine facility located near the Mississippi State University campus. See FIG. 24. The barn was arranged to provide a 120 ft² pen over each of the two flush alleys present. The flush alleys were plugged to form wastewater collection pits similar to those used in commercial swine production facilities. See FIG. 25. The pilot scale BMBRTS was installed on one of the wastewater collection pits in the barn, while the other wastewater collection pit was equipped with an aeration system. The pens contained slatted floors, which allowed feces and urine to fall into the wastewater collection pits below. On the pen equipped with the BMBRTS technology, wastewater was pumped (see FIG. 26) from the wastewater collection pits (serving as the EHR) at a rate of 5 gallons per minute to the top of the BMBR. The BMBR used in the pilot study was 26×42×48 inches (depth x width x height), resulting in a total volume of 30 ft³. See FIG. 27. The BMBR was filled with chopped whole-stalk kenaf fibers. The wastewater proceeded through the BMBR via gravity. As the wastewater trickled through the kenaf, resident microorganisms processed the wastewater, thereby reducing odor and wastewater nutrients.

Figure 28:
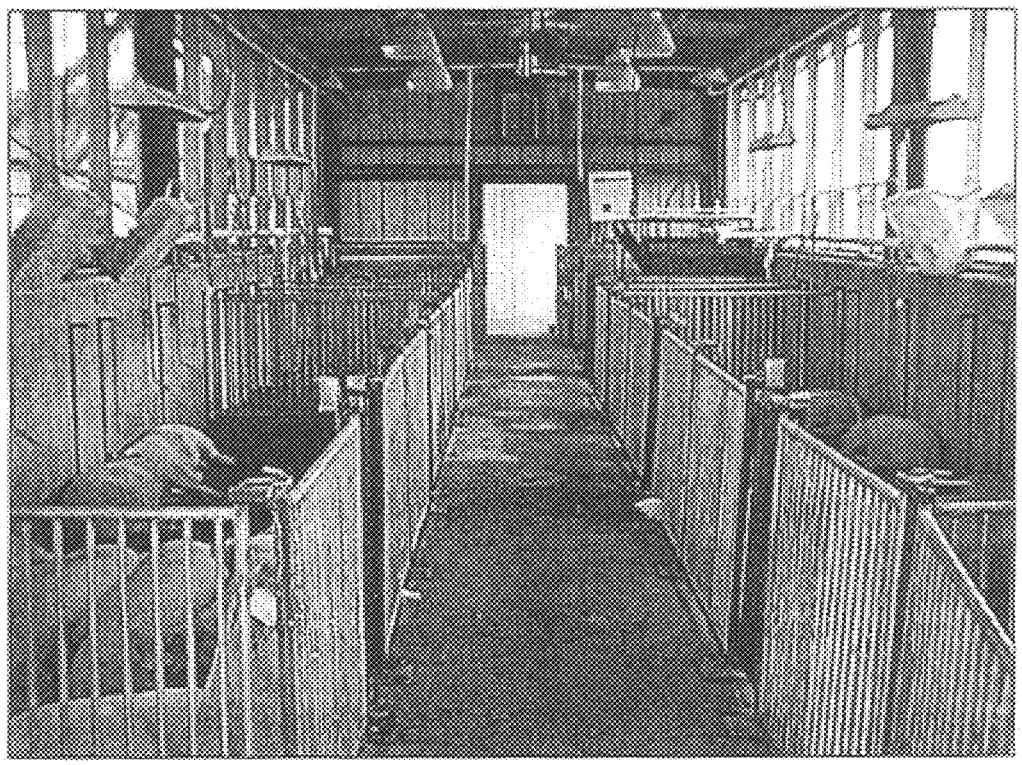
FIG. 28 is a photograph of the interior of the Swine Physiology Facility showing pen arrangements.

Based on the commercial stocking rate of 10 ft² per pig, 11 pigs were placed in each pen as shown in FIG. 28. The pigs produced the feces and urine necessary to compare the BMBRTS with other treatment systems. The pigs were fed a standard diet to create the same urine and feces that is found in a commercial swine production facility.

Wastewater Analysis

During the course of this study, the BMBRTS treatment was compared to three different treatment systems: a control (C), an aerated pit (AP), and an aerated pit with activated sludge (APAS). For the control (C) treatment, the pigs defecated and urinated into the wastewater collection pit with no pit augmentation. For the aerated pit (AP) treatment, atmospheric air was bubbled through the wastewater collection pit using standard municipal aeration devices for the entirety of the 168 hour test duration. For the APAS treatment, the wastewater collection pit was aerated and biologically augmented with activated sludge from a nearby wastewater treatment plant.

Wastewater samples were taken at the midpoint (48 hours) and at the endpoint (168 hours) of each treatment week. Samples were analyzed for $BOD_5$, COD, total Kjeldahl nitrogen (TKN), total phosphorus (TP) in Kjeldahl digest, total solids (TS), volatile solids (VS), nitrate, phenol, and volatile acids. The results are shown in Table 35.

At 168 hours (the test period endpoint), the BMBRTS performed better than all other treatments with regard to the final concentration of COD, TS, VS, nitrate, phenol, and volatile acids. The AP treatment had a lower $BOD_5$ than the BMBRTS at 168 hours. The APAS treatment had lower TKN and TP concentrations at both the midpoint (48 hours) and the endpoint (168 hours). The control (C) treatment had a lower TKN concentration than the BMBRTS at the midpoint (48 hours) and at the endpoint (168 hours).

Odor Analysis

An odor panel analysis was conducted to compare the BMBRTS to the AP treatment. A trained human odor panel evaluated the endpoint wastewater samples on the following characteristics: overall odor intensity, acridity, sulfurous, earthy, musty, fecal, cheesy, sweet/grainy, and ammonia. Results were analyzed using SigmaStat version 2.0 and means were separated by performing the Mann-Whitney Rank Sum Test. Table 36 contains the mean odor panel response and statistical inference data.

The odor from the BMBRTS wastewater samples scored significantly lower than the AP treatment with regard to overall intensity, acridity, sulfurous, fecal, cheesy, and sweet/grainy characteristics. No significant difference was found between the BMBRTS and AP treatment for the musty characteristic. The BMBRTS wastewater samples were statistically different than the AP treatment, indicating that the BMBRTS was changing the odor character of the wastewater as compared to the AP treatment.

The invention of this application is described above both generically, and with regard to specific embodiments. A wide variety of alternatives known to those of ordinary skill in the art can be selected within the generic disclosure, and examples are not to be interpreted as limiting, unless specifically so indicated. The invention is not otherwise limited, except for the recitation of the claims set forth below. All references cited herein are incorporated in their entirety.

TABLE 1

| Wastewater analysis instrumentation and protocol | | |
|---|---|---|
| Analylate | Instrument | Protocol |
| Ammonia | Bausch & Lomb-Spectronic Model 601 | Nessellerization (Colorimetric) |
| $BOD_5$ | YSI Model 5905 BOD Probe, YSI Model 58 DO Meter, and a VWR Scientific Model: 2005 Incubator | Standard Methods, 17th Edition, Procedure 52110 B |
| COD | Hach COD Reactor (Model 45600) and Hach DR/890 Colorimeter | Hach Company, COD Digestion Vial Type - High Range (0–1500 ppm) |
| pH | Fisher Scientific Accumet 950 ph.Ion or Orion SensorLink pH/ISE/ORP | Standard Methods, 17th Edition, Procedure 4500-H |
| Ortho Phosphorus | Lachat QuickChem 8000 Auto Analyzer | Lachat QuickChem Method: 10-115-01-1-A |
| Total Phosphorus | Lachat BD-46 Block Digester and Lachat QuickChem 8000 Auto Analyzer | Lachat QuickChem Method: 10-115-01-1-C |
| TKN | Lachat BD-46 Block Digester and Lachat QuickChem 8000 Auto Analyzer | Lachat QuickChem Method: 10-107-06-2-D |
| Total Solids | Precision Scientific Model 144 Drying Oven (105° C.) | Standard Methods, 17th Edition, Procedure 2540 B |
| Volatile Solids | Precision Scientific Model 144 Drying Oven (105° C.) and Blue M Muffle Furnace (550° C.) | Standard Methods, 17th Edition, Procedure 2540 E |

TABLE 2

Mean response and statistical inference for samples at t = 2 hours.

Odor Components

| Trts | Intensity | Acrid | Sulfur | Earthy | Musty | Fecal | Cheesy | Sweet | $NH_3$ |
|---|---|---|---|---|---|---|---|---|---|
| Influent* | 5.31 | 1.03 | 1.60 | 0.48 | 1.07 | 2.34 | 0.62 | 0.32 | 0.49 |
| Pit** | 4.78 a | 0.75 a | 0.98 a | 0.30 a | 0.80 a | 2.30 a | 0.66 a | 0.70 a | 0.97 a |
| K15 | 2.93 b | 0.31 ab | 0.55 ab | 0.61 a | 0.88 a | 1.27 ab | 0.14 ab | 0.16 b | 0.10 b |
| K50 | 1.99 bc | 0.08 b | 0.26 b | 0.75 a | 0.75 a | 0.63 b | 0.08 b | 0.06 b | 0.17 ab |
| B50 | 1.50 c | 0.12 b | 0.22 b | 0.78 a | 0.82 a | 0.69 b | 0.39 ab | 0.13 b | 0.13 b |
| B15 | 2.89 b | 0.34 ab | 0.44 ab | 0.40 a | 1.19 a | 1.15 b | 0.25 ab | 0.32 ab | 0.42 ab |

*Mean influent odor response at t = 0 hours.
**Control (anaerobic pit simulator).

TABLE 3

Mean response and statistical inference for samples at t = 24 hours.

Odor Components

| Trts | Intensity | Acrid | Sulfur | Earthy | Musty | Fecal | Cheesy | Sweet | $NH_3$ |
|---|---|---|---|---|---|---|---|---|---|
| Influent* | 5.31 | 1.03 | 1.60 | 0.48 | 1.07 | 2.34 | 0.62 | 0.32 | 0.49 |
| Pit** | 6.62 a | 1.35 a | 2.56 a | 0.46 b | 0.78 a | 2.95 a | 0.83 a | 0.35 a | 0.65 a |
| K15 | 3.35 bc | 0.39 ab | 0.03 c | 2.13 a | 1.10 a | 0.05 c | 0.04 b | 0.15 a | 0.00 b |
| K50 | 3.29 bc | 0.45 ab | 0.05 c | 2.08 a | 1.01 a | 0.13 c | 0.20 ab | 0.05 a | 0.00 b |
| B50 | 2.10 c | 0.15 b | 0.04 bc | 0.45 b | 0.52 b | 0.30 c | 0.05 b | 0.05 a | 0.10 b |
| B15 | 4.40 b | 0.35 ab | 1.20 b | 0.95 ab | 1.23 a | 1.90 b | 0.35 ab | 0.00 a | 0.12 b |

*Mean influent odor response at t = 0 hours.
**Control (anaerobic pit simulator).

TABLE 4

Mean response and statistical inference for samples at t = 48 hours.

Odor Components

| Sample | Intensity | Acrid | Sulfur | Earthy | Musty | Fecal | Cheesy | Sweet | $NH_3$ |
|---|---|---|---|---|---|---|---|---|---|
| Initial* | 5.31 | 1.03 | 1.60 | 0.48 | 1.07 | 2.34 | 0.62 | 0.32 | 0.49 |
| Pit** | 6.16 a | 1.72 a | 1.97 a | 0.51 b | 1.16 a | 3.72 a | 0.97 a | 0.36 a | 1.31 a |
| K15 | 4.27 b | 0.29 b | 0.34 b | 2.78 a | 1.53 a | 0.15 b | 0.06 b | 0.08 a | 0.07 b |
| K50 | 3.29 b | 0.08 b | 0.02 b | 2.37 a | 1.55 a | 0.03 b | 0.03 b | 0.14 a | 0.04 b |
| B50 | 1.91 c | 0.06 b | 0.27 b | 1.10 b | 0.89 a | 0.28 b | 0.04 b | 0.16 a | 0.03 b |
| B15 | 1.54 c | 0.08 b | 0.06 b | 0.63 b | 0.86 a | 0.22 b | 0.06 b | 0.09 a | 0.06 b |

*Mean influent odor response at t = 0 hours.
**Control (anaerobic pit simulator).

TABLE 5

$BOD_5$ results during batch run.

| Treatment | Q L/hr | 0 mg/L | 2 mg/L | 4 mg/L | 6 mg/L | 24 mg/L | 48 mg/L | 48 hr BOD Treatment Efficiency % |
|---|---|---|---|---|---|---|---|---|
| K15 (rep 1) | 57 | 762 | 840 | 589 | 252 | 90 | 37 | 95.14 |
| K15 (rep 2) | 57 | 978 | 750 | 338 | 204 | 117 | MD | MD |
| K50 (rep 1) | 190 | 1041 | 600 | 225 | 143.4 | 79 | MD | MD |
| K50 (rep 2) | 190 | 984 | 318 | 213 | 61 | 67 | 25 | 97.46 |
| B15 | 57 | 933 | 918 | 877 | 1050 | 454 | 39 | 95.82 |
| B50 | 190 | 1008 | 960 | 931 | 385 | 66 | 72 | 92.86 |
| Pit 1 (rep 1) | 0 | 978 | 786 | 877 | 558 | 697 | 526 | 46.22 |
| Pit 2 (rep 2) | 0 | 840 | 645 | 850 | 545 | 568 | 733 | 12.74 |

MD Missing Data.

TABLE 6

COD results during batch run.

| Treatment | Q L/hr | 0 mg/L | Sampling Time (hr) 2 mg/L | 4 mg/L | 6 mg/L | 24 mg/L | 48 mg/L | 48 hr COD Treatment Efficiency % |
|---|---|---|---|---|---|---|---|---|
| K15 (rep 1) | 57 | 1363.5 | 1734 | 972 | 579 | 359 | 179 | 86.87 |
| K15 (rep 2) | 57 | 1356 | 2010 | 386 | 551 | 285 | MD | MD |
| K50 (rep 1) | 190 | 1863 | 1248 | 474 | 466 | 462 | MD | MD |
| K50 (rep 2) | 190 | 1444.5 | 1172 | 490 | 462 | 347 | 188 | 86.99 |
| B15 | 57 | 1431 | 2085 | 1718 | 1751 | 956 | 197 | 86.23 |
| B50 | 190 | 1650 | 2164 | 1254 | 1018 | 190 | 216 | 86.91 |
| Pit 1 (rep 1) | 0 | 1618.5 | 1593 | 1362 | 1297 | 1400 | 879 | 45.69 |
| Pit 2 (rep 2) | 0 | 1797 | 1603 | 1386 | 1308 | 1238 | 916 | 49.03 |

MD Missing Data.

TABLE 7

Total Solids results during batch run.

| | | Sampling Times | | | | | Treatment Efficiencies | | |
|---|---|---|---|---|---|---|---|---|---|
| Treatments | Q L/hr | 0 mg/L | 2 mg/L | 6 mg/L | 24 mg/L | 48 mg/L | 6 % | 24 % | 48 % |
| K15 (rep 1) | 57 | 1.215 | 0.944 | 0.911 | 0.605 | 0.594 | 25.02 | 50.21 | 51.11 |
| K15 (rep 2) | 57 | 1.477 | 1.083 | 0.704 | 0.534 | MD | 52.34 | 63.85 | MD |
| K50 (rep 1) | 190 | 1.634 | 0.991 | 0.898 | 0.599 | MD | 45.04 | 63.34 | MD |
| K50 (rep 2) | 190 | 1.339 | 0.913 | 0.736 | 0.564 | 0.667 | 45.03 | 57.88 | 50.19 |
| B15 | 57 | 1.402 | 1.463 | 1.615 | 0.824 | 0.365 | — | 41.23 | 73.97 |
| B50 | 190 | 1.337 | 0.844 | 1.316 | 0.451 | 0.48 | 1.57 | 66.27 | 64.10 |
| Pit 1 (rep 1) | 0 | 1.431 | 1.147 | 1.079 | 0.919 | 0.653 | 24.60 | 35.78 | 54.37 |
| Pit 2 (rep 2) | 0 | 1.513 | 1.206 | 1.106 | 0.938 | 0.845 | 26.90 | 38.00 | 44.15 |

MD Missing Data
— Denotes increase in value

TABLE 8

Volatile Solids results during batch run.

| | | Sampling Times | | | | | Treatment Efficiencies | | |
|---|---|---|---|---|---|---|---|---|---|
| Treatments | Q L/hr | 0 mg/L | 2 mg/L | 6 mg/L | 24 mg/L | 48 mg/L | 6 % | 24 % | 48 % |
| K15 (rep 1) | 57 | 0.919 | 0.909 | 0.961 | 0.255 | 0.541 | — | 72.25 | 41.13 |
| K15 (rep 2) | 57 | 1.124 | 0.997 | 0.527 | 0.242 | MD | 53.11 | 78.47 | MD |
| K50 (rep 1) | 190 | 1.322 | 0.975 | 0.721 | 0.1 | MD | 45.46 | 92.44 | MD |
| K50 (rep 2) | 190 | 0.958 | 0.739 | 0.334 | 0.095 | 0.235 | 65.14 | 90.08 | 75.47 |
| B15 | 57 | 1.291 | 1.421 | 1.399 | 0.482 | 0.245 | — | 62.66 | 81.02 |
| B50 | 190 | 1.285 | 0.611 | 1.194 | 0.174 | 0.208 | 7.08 | 86.46 | 83.81 |
| Pit 1 (rep 1) | 0 | 1.337 | 1.136 | 0.877 | 0.575 | 0.624 | 34.41 | 56.99 | 53.33 |
| Pit 2 (rep 2) | 0 | 1.446 | 0.958 | 0.786 | 0.588 | 0.439 | 45.64 | 59.34 | 69.64 |

MD Missing Data
— Denotes increase in value

TABLE 9

Odor Level Scale.

| 1 | No Odor |
|---|---|
| 2 | Faint Odor |
| 3 | Medium Odor |
| 4 | Strong Odor |
| 5 | Very Strong Odor |

TABLE 10

Analysis of TS (total solids) Data (3 Day period).

| | Day 1 TS mg/L | Day 2 TS mg/L | Day 3 TS mg/L | % Reduction Day 1–3 |
|---|---|---|---|---|
| Bioreactor Averages | 2.08 | 0.74 | 0.654 | 68.61 |
| Control Averages | 2.48 | 2.95 | 2.34 | 5.60 |

TABLE 11

Analysis of VS (volatile solids) Data (3 Day period).

| | Day 1 VS (mg/l) | Day 3 VS (mg/l) | % Reduction Day 1–3 |
|---|---|---|---|
| Bioreactor Averages | 1.66---- | 0.348 | 78.99 |
| Control Averages | 1.97 | 1.79 | 8.905 |

TABLE 12

Analysis of $BOD_5$ Data (3 Day period).

| | $BOD_{5i}$ (mg/l) | $BOD_{5f}$ (mg/l) | % Reduction $BOD_5$ |
|---|---|---|---|
| Tube Averages | 1442 | 73.14 | 94.93 |
| Control Averages | 1714 | 968.1 | 43.53 |

TABLE 13

Average $BOD_5$ data for treatments expressed in mg/L.

| | Sampling intervals (hr) | | | | | |
|---|---|---|---|---|---|---|
| TRT | 0 | 2 | 4 | 6 | 24 | 48 |
| K | 4550.5 | 1829.0 | 1141.5 | 563.1 | 72.9 | 380.4 |
| BR | 3161.8 | 2065.0 | 1104.0 | 600.6 | 113.3 | 152.82 |
| R | 2886.0 | 2513.4 | 954.0 | 797.1 | 146.4 | 208.46 |
| PC | 1669.3 | 2423.4 | 622.5 | 461.2 | 57.3 | 184.2 |
| SK | 1010.2 | 1476.8 | 6139.8 | 1432.8 | 341.22 | 61.8 |
| Pit | 54.84 | 506.4 | 115.5 | 49.7 | 30.6 | 278.4 |

TABLE 14

Treatment efficiencies for $BOD_5$ data expressed as % reduction.

| | Sampling intervals (hr) | | | | | |
|---|---|---|---|---|---|---|
| TRT | 0 | 2 | 4 | 6 | 24 | 48 |
| K | 0 | 59.81 | 74.91 | 87.63 | 98.40 | 91.64 |
| BR | 0 | 34.69 | 65.08 | 81.00 | 96.42 | 95.17 |
| R | 0 | 12.91 | 66.94 | 72.38 | 94.93 | 92.78 |
| PC | 0 | 0 | 62.71 | 72.37 | 96.57 | 88.97 |
| SK | 0 | 0 | 0 | 0 | 66.22 | 93.88 |
| Pit | 0 | 0 | 0 | 9.39 | 44.21 | 0 |

Note:
0's indicate no treatment or an increase in the component measured.

TABLE 15

Average COD data for treatments expressed in mg/L.

| | Sampling interval (hr) | | | | | |
|---|---|---|---|---|---|---|
| TRT | 0 | 2 | 4 | 6 | 24 | 48 |
| K | 1766.33 | 1727.00 | 1130.33 | 654.67 | 68.67 | 90.00 |
| BR | 1335.00 | 1978.67 | 2199.67 | 2046.67 | 243.17 | 136.00 |
| R | 2624.33 | 1194.33 | 1867.33 | 994.67 | 168.67 | 174.17 |
| PC | 1450.33 | 904.33 | 368.00 | 375.33 | 163.67 | 82.67 |
| SK | 2459.33 | 1708.00 | 1452.67 | 1387.33 | 504.41 | 113.73 |
| Pit | 2783.33 | 1657.33 | 1450.00 | 1272.67 | 443.14 | 2150.49 |

TABLE 16

Treatment efficiencies for COD data expressed as % reduction.

| | Sampling interval (hr) | | | | | |
|---|---|---|---|---|---|---|
| TRT | 0 | 2 | 4 | 6 | 24 | 48 |
| K | 0 | 2.23 | 36.01 | 62.94 | 96.11 | 94.90 |
| BR | 0 | 0 | −64.77 | 0 | 81.79 | 89.81 |
| R | 0 | 54.49 | 28.85 | 62.10 | 93.57 | 93.36 |
| PC | 0 | 37.65 | 74.63 | 74.12 | 88.72 | 94.30 |
| SK | 0 | 30.55 | 40.93 | 43.59 | 79.49 | 95.38 |
| Pit | 0 | 40.46 | 47.90 | 54.28 | 84.08 | 22.74 |

Note:
0's indicate no treatment or an increase in the component measured.

TABLE 17

Average TS data for treatments expressed in mg/L.

| | Sampling interval (hr) | | | | | |
|---|---|---|---|---|---|---|
| TRT | 0 | 2 | 4 | 6 | 24 | 48 |
| K | 1741 | 1597 | 1307 | 856 | 565 | 889 |
| BR | 1864 | 1923 | 1696 | 1504 | 925 | 836 |
| R | 2063 | 1768 | 1397 | 1318 | 777 | 836 |
| PC | 1797 | 1204 | 1073 | 652 | 614 | 874 |
| SK | 1953 | 1399 | 1224 | 1167 | 809 | 640 |
| Pit | 1700 | 1426 | 1269 | 1133 | 1248 | 1407 |

TABLE 18

Treatment efficiencies for TS data expressed as % reduction.

| | Sampling interval (hr) | | | | | |
|---|---|---|---|---|---|---|
| TRT | 0 | 2 | 4 | 6 | 24 | 48 |
| K | 0 | 8.27 | 24.93 | 50.83 | 67.55 | 48.94 |
| BR | 0 | 0 | 9.01 | 19.31 | 50.38 | 55.15 |
| R | 0 | 14.30 | 32.28 | 36.11 | 62.34 | 59.48 |
| Pc | 0 | 33.00 | 40.29 | 63.72 | 65.83 | 51.36 |
| SK | 0 | 28.37 | 37.33 | 40.25 | 58.58 | 67.23 |
| Pit | 0 | 16.12 | 25.35 | 33.35 | 26.59 | 17.24 |

Note:
0's indicate no treatment or an increase in the component measured.

TABLE 19

Average VS data for treatments expressed in mg/L.

| TRT | Sampling interval (hr) | | | | | |
|---|---|---|---|---|---|---|
| | 0 | 2 | 4 | 6 | 24 | 48 |
| K | 1311 | 1353 | 1392 | 744 | 129 | 363 |
| BR | 1470 | 1690 | 1650 | 1397 | 460 | 351 |
| R | 1627 | 1545 | 1267 | 1125 | 194 | 352 |
| PC | 1265 | 1041 | 949 | 576 | 198 | 406 |
| SK | 1603 | 1080 | 954 | 859 | 541 | 312 |
| Pit | 1315 | 1276 | 1138 | 1024 | 683 | 894 |

TABLE 20

Treatment efficiencies for VS data expressed as % reduction.

| TRT | Sampling interval (hr) | | | | | |
|---|---|---|---|---|---|---|
| | 0 | 2 | 4 | 6 | 24 | 48 |
| K | 0 | 0 | 0 | 43.25 | 90.16 | 72.31 |
| BR | 0 | 0 | 0 | 4.97 | 68.71 | 76.12 |
| R | 0 | 5.04 | 22.13 | 30.85 | 88.08 | 78.37 |
| PC | 0 | 17.71 | 24.98 | 54.47 | 84.35 | 67.91 |
| SK | 0 | 32.63 | 40.49 | 46.41 | 66.25 | 80.54 |
| Pit | 0 | 2.97 | 13.46 | 22.13 | 48.06 | 32.02 |

Note:
0's indicate no treatment or an increase in the component measured.

TABLE 21

Average TKN data for treatments expressed in mg/L.

| TRT | Sampling interval (hr) | | | | | |
|---|---|---|---|---|---|---|
| | 0 | 2 | 4 | 6 | 24 | 48 |
| K | 93.31 | 47.86 | 94.57 | 65.93 | 24.61 | 20.74 |
| BR | 118.63 | 126.57 | 115.22 | 74.65 | 28.33 | 55.85 |
| R | 153.74 | 121.44 | 128.50 | 80.77 | 39.17 | 44.94 |
| PC | 148.95 | 91.81 | 66.96 | 62.67 | 23.14 | 27.87 |
| SK | 125.24 | 104.26 | 102.93 | 81.91 | 52.43 | 33.37 |
| Pit | 67.45 | 112.40 | 72.70 | 52.83 | 90.66 | 82.20 |

TABLE 22

Treatment efficiencies for TKN data expressed as % reduction.

| TRT | Sampling interval (hr) | | | | | |
|---|---|---|---|---|---|---|
| | 0 | 2 | 4 | 6 | 24 | 48 |
| K | 0 | 48.71 | 0 | 29.34 | 73.63 | 77.78 |
| BR | 0 | 0 | 2.87 | 37.07 | 76.12 | 52.93 |
| R | 0 | 21.01 | 16.41 | 47.46 | 74.52 | 70.77 |
| PC | 0 | 38.36 | 55.05 | 57.92 | 84.46 | 81.29 |
| SK | 0 | 16.75 | 17.81 | 34.60 | 58.13 | 73.36 |
| Pit | 0 | 0 | 0 | 21.67 | 0 | 0 |

Note:
0's indicate no treatment or an increase in the component measured.

TABLE 23

Average NH$_3$ data for treatments expressed in mg/L.

| TRT | Sampling interval (hr) | | | | | |
|---|---|---|---|---|---|---|
| | 0 | 2 | 4 | 6 | 24 | 48 |
| K | 31.10 | 60.51 | 84.96 | 45.22 | 11.31 | 2.99 |
| BR | 38.02 | 71.43 | 82.03 | 69.86 | 11.53 | 23.18 |
| R | 30.90 | 129.08 | 93.94 | 74.46 | 27.82 | 34.15 |
| PC | 39.47 | 82.86 | 72.48 | 55.69 | 11.23 | 13.84 |
| SK | 61.33 | 52.82 | 51.87 | 56.69 | 31.68 | 21.58 |
| Pit | 33.21 | 89.20 | 83.55 | 74.20 | 71.31 | 38.21 |

TABLE 24

Treatment efficiencies for NH$_3$ data expressed as % reduction.

| TRT | Sampling interval (hr) | | | | | |
|---|---|---|---|---|---|---|
| | 0 | 2 | 4 | 6 | 24 | 48 |
| K | 0 | 0 | 0 | 0 | 63.64 | 90.40 |
| BR | 0 | 0 | 0 | 0 | 69.69 | 39.03 |
| R | 0 | 0 | 0 | 0 | 9.97 | 0 |
| PC | 0 | 0 | 0 | 0 | 71.56 | 64.94 |
| SK | 0 | 13.87 | 15.42 | 7.57 | 48.35 | 64.81 |
| Pit | 0 | 0 | 0 | 0 | 0 | 0 |

Note:
0's indicate no treatment or an increase in the component measured.

TABLE 25

Average TP data for treatments expressed in mg/L.

| TRT | Sampling interval (hr) | | | | | |
|---|---|---|---|---|---|---|
| | 0 | 2 | 4 | 6 | 24 | 48 |
| K | 38.74 | 42.02 | 41.19 | 36.53 | 27.12 | 28.30 |
| BR | 50.42 | 37.30 | 49.11 | 39.42 | 27.15 | 24.30 |
| R | 53.47 | 43.10 | 50.75 | 41.53 | 30.83 | 33.33 |
| PC | 47.44 | 39.43 | 36.16 | 34.59 | 67.56 | 29.63 |
| SK | 44.63 | 38.23 | 39.46 | 33.52 | 27.59 | 19.27 |
| Pit | 38.93 | 42.89 | 46.91 | 46.51 | 43.15 | 46.94 |

TABLE 26

Treatment efficiencies for TP expressed in % reduction.

| TRT | Sampling interval (hr) | | | | | |
|---|---|---|---|---|---|---|
| | 0 | 2 | 4 | 6 | 24 | 48 |
| K | 0 | 0 | 0 | 5.72 | 29.99 | 26.95 |
| BR | 0 | 26.03 | 2.60 | 21.82 | 46.16 | 51.80 |
| R | 0 | 19.40 | 5.08 | 22.32 | 42.34 | 37.66 |
| PC | 0 | 16.88 | 23.78 | 27.08 | 0 | 37.54 |
| SK | 0 | 14.33 | 11.59 | 24.89 | 38.18 | 56.83 |
| Pit | 0 | 0 | 0 | 0 | 0 | 0 |

Note:
0's indicate no treatment or an increase in the component measured.

TABLE 27

Average OP data for treatments expressed in mg/L.

| TRT | Sampling interval (hr) | | | | | |
|---|---|---|---|---|---|---|
| | 0 | 2 | 4 | 6 | 24 | 48 |
| K | 32.73 | 34.41 | 29.10 | 26.21 | 23.25 | 23.47 |
| BR | 31.40 | 34.84 | 31.56 | 28.87 | 21.16 | 19.55 |
| R | 33.49 | 33.92 | 31.17 | 31.09 | 24.52 | 26.86 |
| PC | 33.78 | 26.87 | 26.35 | 25.83 | 23.26 | 21.87 |
| SK | 27.76 | 27.86 | 28.12 | 25.39 | 31.94 | 15.24 |
| Pit | 30.71 | 28.73 | 30.12 | 29.44 | 32.35 | 40.16 |

TABLE 28

Treatment efficiencies for OP data expressed as % reduction.

| TRT | Sampling interval (hr) | | | | | |
|---|---|---|---|---|---|---|
| | 0 | 2 | 4 | 6 | 24 | 48 |
| K | 0 | 0 | 11.09 | 19.92 | 28.96 | 28.29 |
| BR | 0 | 0 | 0 | 8.06 | 32.63 | 37.74 |
| R | 0 | 0 | 6.91 | 7.17 | 26.77 | 19.78 |
| PC | 0 | 20.46 | 22.00 | 23.52 | 31.13 | 35.25 |
| SK | 0 | 0 | 0 | 8.54 | 0 | 45.09 |
| Pit | 0 | 6.43 | 1.92 | 4.14 | 0 | 0 |

Note:
0's indicate no treatment or an increase in the component measured.

TABLE 29

Treatment ranks at t = 24 hours.

| | Water Quality Parameters Tested | | | | | | | | |
|---|---|---|---|---|---|---|---|---|---|
| | $BOD_5$ | COD | TS | VS | TKN | $NH_3$ | TP | OP | Totals |
| K | 1 | 1 | 1 | 1 | 4 | 3 | 4 | 3 | 18 |
| BR | 3 | 5 | 5 | 4 | 2 | 2 | 1 | 1 | 23 |
| R | 4 | 2 | 3 | 2 | 3 | 5 | 2 | 4 | 25 |
| PC | 2 | 3 | 2 | 3 | 1 | 1 | 6 | 2 | 20 |
| SK | 5 | 6 | 4 | 6 | 5 | 4 | 3 | 6 | 39 |
| Pit | 6 | 4 | 6 | 5 | 6 | 6 | 5 | 5 | 43 |

TABLE 30

Treatment ranks at t = 48 hours.

| | Water Quality Parameters Tested | | | | | | | | |
|---|---|---|---|---|---|---|---|---|---|
| | $BOD_5$ | COD | TS | VS | TKN | $NH_3$ | TP | OP | Totals |
| K | 4 | 2 | 5 | 4 | 2 | 1 | 5 | 4 | 27 |
| BR | 1 | 5 | 3 | 3 | 5 | 4 | 2 | 2 | 25 |
| R | 3 | 4 | 2 | 2 | 4 | 5 | 3 | 5 | 33 |
| PC | 5 | 3 | 4 | 5 | 1 | 2 | 4 | 3 | 27 |
| SK | 2 | 1 | 1 | 1 | 3 | 3 | 1 | 1 | 13 |
| Pit | 6 | 6 | 6 | 6 | 6 | 6 | 6 | 6 | 48 |

TABLE 31

Composite and average treatment ranks.

| | 24 Hour | 48 Hour | Total | Ave. Rank |
|---|---|---|---|---|
| K | 1 | 3 | 4 | 2 |
| BR | 3 | 2 | 5 | 2.5 |
| R | 4 | 5 | 9 | 4.5 |
| PC | 2 | 3 | 5 | 2.5 |
| SK | 5 | 1 | 6 | 3 |
| Pit | 6 | 6 | 12 | 6 |

TABLE 32

Mean response and statistical inference for samples at t = 0 hours.

| Trts | Intensity | | Acrid | | Sulfur | | Earthy | | Musty | | Fecal | | Cheesy | | NH3 | |
|---|---|---|---|---|---|---|---|---|---|---|---|---|---|---|---|---|
| K | 4.78 | ab | 0.72 | ab | 0.65 | ab | 0.80 | a | 1.1 | a | 2.25 | a | 0.8 | ab | 0.69 | abc |
| PC | 5.4 | ab | 0.73 | ab | 0.70 | ab | 0.40 | ab | 0.9 | a | 2.15 | a | 1.5 | a | 0.9 | ab |
| R | 6.0 | a | 0.95 | a | 0.60 | ab | 0.45 | ab | 1.65 | a | 2.47 | a | 0.8 | ab | 1.25 | a |
| BR | 4.15 | b | 0.80 | ab | 1.0 | a | 0.10 | b | 1.2 | a | 1.2 | a | 1.0 | ab | 0.45 | bc |
| Pit | 4.15 | b | 0.55 | ab | 0.75 | ab | 0.57 | ab | 1.02 | a | 1.8 | a | 0.9 | ab | 0.47 | bc |

Note: Means with the same letter are not significantly different.

TABLE 33

Mean response and statistical inference for samples at t = 24 hours.

| | | | | | | | Odor Components | | | | | | | | | | |
|---|---|---|---|---|---|---|---|---|---|---|---|---|---|---|---|---|---|
| Trts | Intensity | | Acrid | | Sulfur | | Earthy | | Musty | | Fecal | | Cheesy | | NH3 | |
| K | 4.5 | b | 0 | b | 0.0625 | ab | 3.775 | a | 1.75 | b | 0 | b | 0 | b | 0 | a |
| PC | MD | MD | MD | MD | MD | MD | MD | MD | MD | MD | MD | MD | MD | MD | MD | MD |
| R | 2.563 | b | 0 | b | 0.125 | ab | 0.5625 | b | 1.3125 | b | 0.375 | b | 0.375 | ab | 0.625 | a |
| BR | 0.625 | b | 0 | b | 0 | b | 0.125 | b | 0.4 | b | 0.0875 | b | 0.625 | b | 0 | a |
| Pit | 5.625 | a | 0.75 | a | 0.5625 | a | 0.25 | b | 2.3125 | a | 2.8125 | a | 1.0625 | a | 0.15 | a |

Note: Means with the same letter are not significantly different.
MD = Missing Data

TABLE 34

Mean response and statistical inference for samples at t = 48 hours.

| | | | | | | | Odor Components | | | | | | | | | | |
|---|---|---|---|---|---|---|---|---|---|---|---|---|---|---|---|---|---|
| Trts | Intensity | | Acrid | | Sulfur | | Earthy | | Musty | | Fecal | | Cheesy | | NH3 | |
| K | 3.35 | bc | 0.125 | b | 0 | b | 0.6875 | b | 1.15 | a | 0.25 | c | 0.1875 | b | 0.5 | a |
| PC | 4.074 | b | 0 | b | 0 | b | 2.3571 | a | 1.8571 | a | 0 | c | 0 | b | 0 | a |
| R | 5.0 | b | 0.1875 | b | 0.1875 | b | 0.6875 | b | 1.625 | a | 1.625 | b | 0.4 | b | 0.5 | a |
| BR | 2.025 | c | 0 | b | 0.0625 | b | 0.5 | b | 1.125 | a | 0.1875 | c | 0 | b | 0 | a |
| Pit | 6.9375 | a | 1.4375 | a | 1.5375 | a | 0.0625 | b | 1.8125 | a | 4.0 | a | 1.375 | a | 0.3125 | a |

Note: Means with the same letter are not significantly different.

TABLE 35

Wastewater Analysis Results

| | COD (mg/L) | BOD5 (mg/L) | TS (mg/L) | VS (mg/L) | TKN (mg/L) | TP (mg/L) | Nitrate (mg/L) | Phenol (mg/L) | Volatile Acids (mg/L) |
|---|---|---|---|---|---|---|---|---|---|
| BMBRTS 9/29/99–10/6/99 | | | | | | | | | |
| Mid | 388.33 | 338.55 | 941.33 | 510.00 | 183.38 | 26.93 | 40.65 | 0.15 | 13.50 |
| End | 1625.00 | 576.00 | 2542.00 | 1302.67 | 370.98 | 60.46 | 181.50 | 0.98 | 134.44 |
| Control 9/29/99–10/6/99 | | | | | | | | | |
| Mid | 263.00 | 389.85 | 644.00 | 374.00 | 136.33 | 18.90 | 238.90 | 0.52 | 57.50 |
| End | 2520.00 | 1660.00 | 2702.00 | 1530.00 | 344.32 | 87.40 | 1139.00 | 1.81 | 995.50 |
| BMBRTS 10/7/99–10/27/99 | | | | | | | | | |
| Average Mid | 671.33 | 437.97 | 882.67 | 505.50 | 169.40 | 34.23 | 231.70 | 0.43 | 69.00 |
| Average End | 1894.83 | 2075.27 | 2314.33 | 1424.33 | 429.13 | 46.16 | 384.05 | 1.72 | 430.33 |
| Aeration 10/7/99–10/27/99 | | | | | | | | | |
| Mid | 626.83 | 535.27 | 668.67 | 387.33 | 110.68 | 18.54 | 114.33 | 0.75 | 63.50 |
| End | 2124.89 | 1354.97 | 2447.53 | 1713.67 | 528.09 | 45.99 | 683.29 | 3.78 | 788.33 |
| BMBRTS 10/29/99–11/03/99 | | | | | | | | | |
| Mid | 731.42 | 1446.98 | 1704.30 | 1754.50 | 296.27 | 41.78 | 116.75 | 0.62 | 73.50 |
| End | 1445.83 | 2213.50 | 2457.50 | 1369.50 | 644.72 | 37.50 | 209.00 | 2.05 | 457.50 |
| Aeration w/AS 10/29/99–11/03/99 | | | | | | | | | |
| Mid | 417.50 | 2041.00 | 604.00 | 397.00 | 185.73 | 12.33 | 19.25 | 0.58 | 27.50 |
| End | 2189.67 | 2628.50 | 2770.00 | 1708.00 | 625.95 | 29.90 | 235.05 | 4.21 | 571.00 |

What is claimed is:

1. A system for treating wastewater comprising:
   a holding reservoir,
   a pump,
   a filtration device,
   a first aeration space,
   a biological reactor, and
   a second aeration space;
   wherein said pump pumps said wastewater from said holding reservoir to said filtration device where said wastewater then flows consecutively through said filtration device, said first aeration space, said biological reactor, and said second aeration space into said holding reservoir; and
   wherein said filtration device and biological reactor contains both bast and core fibers as a biological treatment medium, said bast and core fibers being whole-stalk chopped kenaf.

2. The system for treating wastewater of claim 1, wherein said pump pumps said wastewater upward from said holding reservoir to said filtration device where said wastewater then flows downward consecutively through said filtration device, said first aeration space, said biological reactor, and said second aeration space into said holding reservoir.

3. The system for treating wastewater of claim 1, wherein said core fibers absorb odorous compounds.

4. The system for treating wastewater of claim 1, wherein said bast and core fibers contain naturally occurring microorganisms to biologically treat said wastewater.

5. The system for treating wastewater of claim 4, wherein said microorganisms are selected from the group consisting of aerobic bacteria, anaerobic bacteria, facultative bacteria, fungi, algae and protozoan microorganisms.

6. The system for treating wastewater of claim 1, wherein said filtration device removes settleable solids.

7. The system for treating wastewater of claim 1, wherein said holding reservoir holds said wastewater for treatment and provides primary clarification.

8. The system for treating wastewater of claim 1, wherein said bast and core fibers provide both aerobic and anaerobic biological treatment.

9. The system for treating wastewater of claim 1, wherein said bast and core fibers absorb odorous compounds.

10. A method for treating wastewater comprising the steps of:
    collecting said wastewater in a holding reservoir,
    pumping said wastewater to a filtration device,
    flowing said wastewater consecutively through said filtration device, a first aeration space, a biological reactor, and a second aeration space into said holding reservoir,
    wherein said filtration device and biological reactor contain both bast and core fibers as a biological treatment medium, said bast and core fibers being whole-stalk chopped kenaf.

11. The method of claim 10, wherein said wastewater is pumped upward from said holding reservoir to said filtration device where said wastewater then flows downward consecutively through said filtration device, said first aeration space, said biological reactor, and said second aeration space into said holding reservoir.

12. The method of claim 10, further comprising the steps of:
    removing said bast and core fibers when said bast and core fibers become plugged such that the flow of wastewater through said bast and core fibers slows or stops, and replacing said plugged bast and core fibers with new and/or renovated bast and core fibers.

13. The method of claim 12, further comprising the step of composting said plugged bast and core fibers to produce compost usable on-site for crop production or off-site as a value-added plant fertilizer or soil amendment.

* * * * *